(12) United States Patent
McCorkle

(10) Patent No.: US 7,903,778 B2
(45) Date of Patent: Mar. 8, 2011

(54) LOW POWER, HIGH RESOLUTION TIMING GENERATOR FOR ULTRA-WIDE BANDWIDTH COMMUNICATION SYSTEMS

(75) Inventor: John W. McCorkle, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/591,561

(22) Filed: Nov. 24, 2009

(65) Prior Publication Data

US 2010/0135358 A1    Jun. 3, 2010

Related U.S. Application Data

(63) Continuation of application No. 11/183,778, filed on Jul. 19, 2005, now Pat. No. 7,643,533, which is a continuation of application No. 09/685,199, filed on Oct. 10, 2000, now Pat. No. 6,975,665.

(51) Int. Cl.
*H04L 23/00* (2006.01)
(52) U.S. Cl. ......... 375/377; 375/147; 375/316; 375/371; 375/376; 375/130
(58) Field of Classification Search .......... 375/147, 375/316, 130, 371, 376, 136, 377
See application file for complete search history.

(56) References Cited

U.S. PATENT DOCUMENTS

| | | | |
|---|---|---|---|
| 3,898,991 A | 8/1975 | Ikuno et al. | |
| 4,136,313 A | 1/1979 | Molochnikov et al. | |
| 5,132,633 A | 7/1992 | Wong et al. | |
| 5,563,605 A | 10/1996 | McEwan | |
| 5,677,927 A | 10/1997 | Fullerton | |
| 5,708,383 A | 1/1998 | Lee | |
| 5,832,035 A | 11/1998 | Fullerton | |
| 5,834,985 A | 11/1998 | Sundeg.ang.rd | |
| 5,852,630 A | 12/1998 | Langberg et al. | |
| 6,304,623 B1 | 10/2001 | Richards et al. | |
| 6,351,246 B1 | 2/2002 | McCorkle | |
| 6,505,032 B1 | 1/2003 | McCorkle | |
| 6,556,621 B1 | 4/2003 | Richards et al. | |
| 6,614,813 B1 * | 9/2003 | Dudley et al. ............. | 370/532 |
| 6,700,939 B1 | 3/2004 | McCorkle et al. | |
| 6,735,238 B1 | 5/2004 | McCorkle | |

OTHER PUBLICATIONS

U.S. Appl. No. 60/207,225, filed May 26, 2000, McCorkle.
U.S. Appl. No. 60/217,099, filed Jul. 10, 2000, Miller.
U.S. Appl. No. 09/633,815, filed Aug. 7, 2000, McCorkle.
U.S. Appl. No. 60/238,466, filed Oct. 10, 2000, McCorkle.
U.S. Appl. No. 09/684,401, filed Oct. 10, 2000, Miller.
U.S. Appl. No. 09/684,782, filed Oct. 10, 2000, McCorkle.
U.S. Appl. No. 09/685,195, filed Oct. 10, 2000, Miller.
U.S. Appl. No. 09/685,196, filed Oct. 10, 2000, Miller.
U.S. Appl. No. 09/685,197, filed Oct. 10, 2000, Miller.
U.S. Appl. No. 09/685,198, filed Oct. 10, 2000, McCorkle.
U.S. Appl. No. 09/685,200, filed Oct. 10, 2000, McCorkle.
U.S. Appl. No. 09/685,202, filed Oct. 10, 2000, Rofheart.
U.S. Appl. No. 09/685,203, filed Oct. 10, 2000, Miller.
U.S. Appl. No. 09/685,205, filed Oct. 10, 2000, McCorkle.

* cited by examiner

*Primary Examiner* — Ted M Wang

(57) ABSTRACT

A control generator is provided, comprising: a summer configured to add a ramping phase adjustment signal and a basic phase adjustment signal to generate a combined phase adjustment signal based on the combined phase adjustment signal; a look-up table configured to generate first through $N^{th}$ digital phase and frequency adjustment signals; and first through $N^{th}$ digital to analog converters configured to convert the first through $N^{th}$ digital phase and frequency adjustment signals to first through $N^{th}$ analog phase and frequency adjustment signals in accordance with first through $N^{th}$ clock signals, respectively. wherein N is an integer greater than 1.

19 Claims, 15 Drawing Sheets

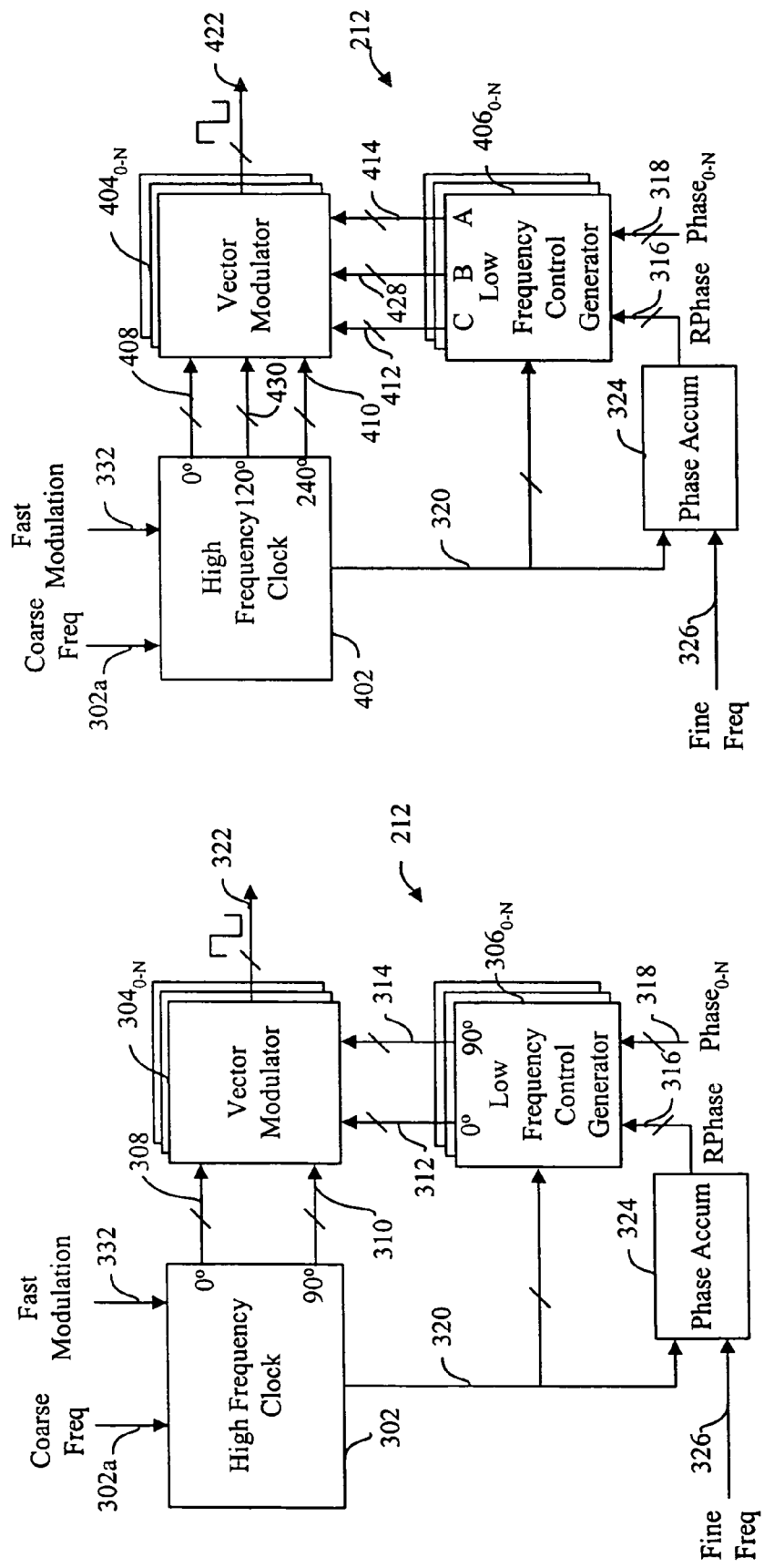

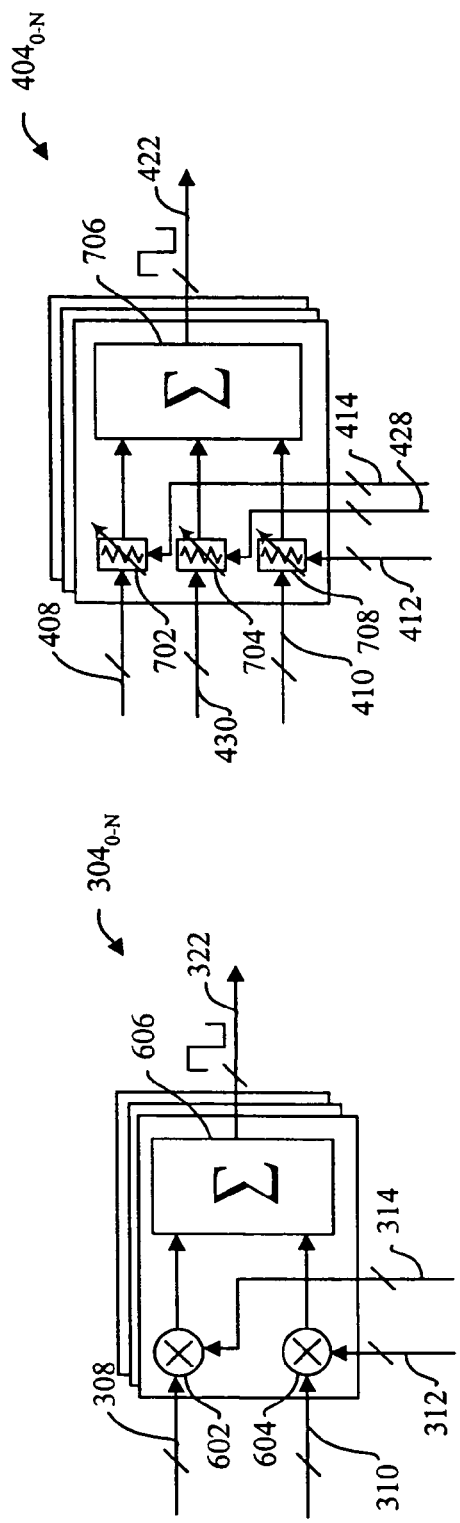
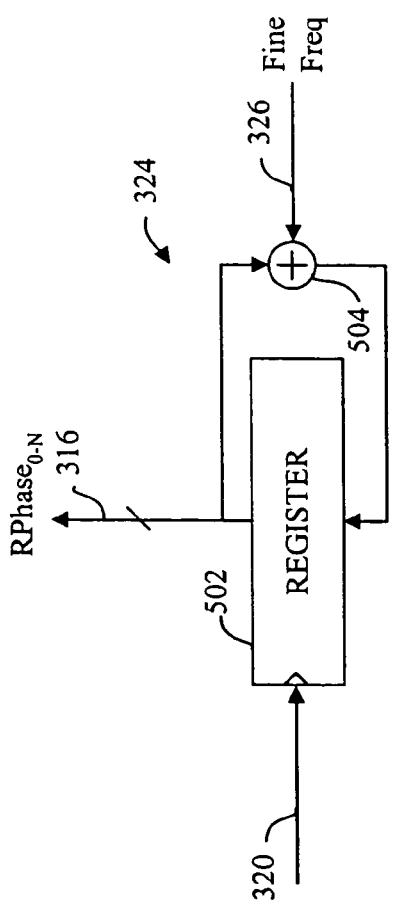

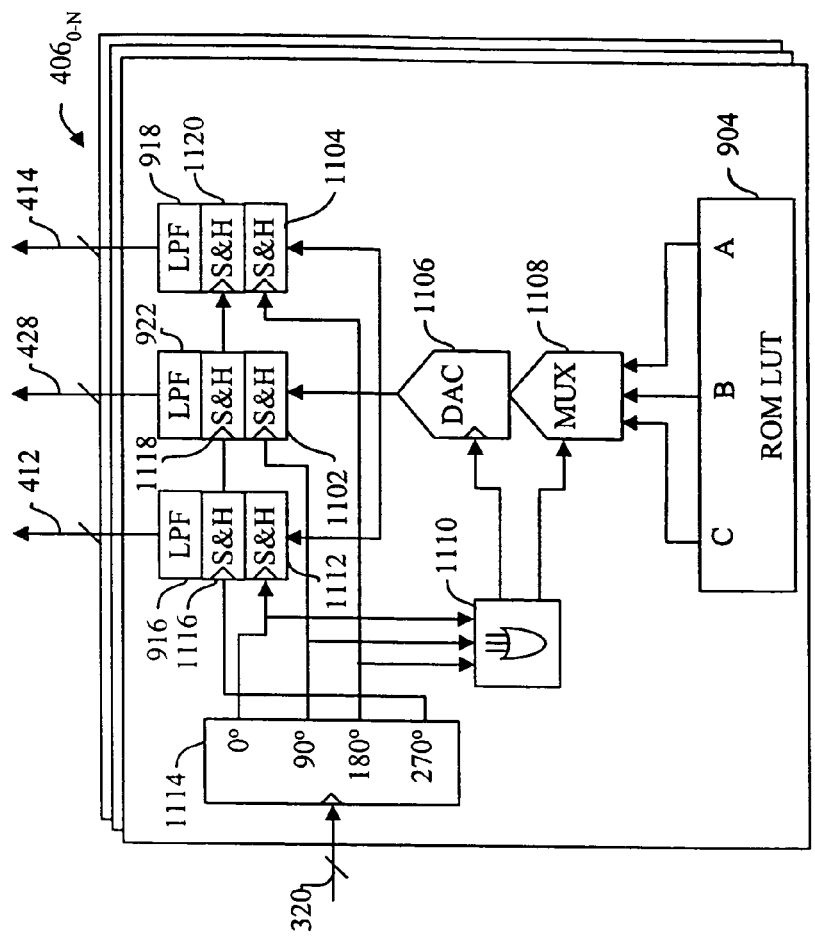
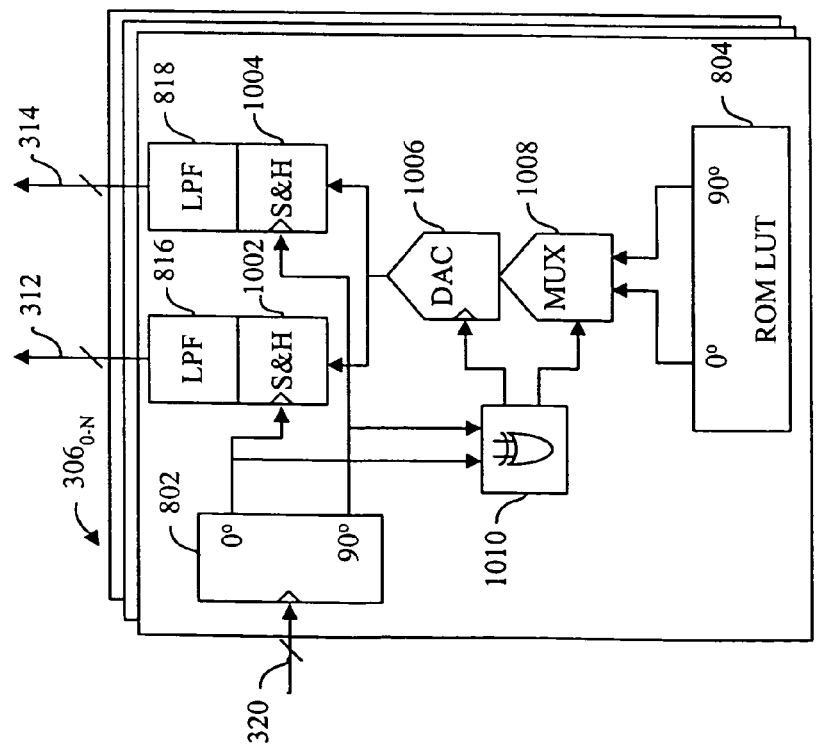
FIGURE 11
FIGURE 10

LOW POWER, HIGH RESOLUTION TIMING GENERATOR FOR ULTRA-WIDE BANDWIDTH COMMUNICATION SYSTEMS

CROSS REFERENCE TO RELATED PATENT DOCUMENTS

The present application is a continuation application of U.S. patent application Ser. No. 11/183,778, filed Jul. 19, 2005, entitled AGILE CLOCK MECHANISM AND METHOD FOR ULTRAWIDE BANDWIDTH COMMUNICATIONS SYSTEM, which is a continuation application of U.S. patent application Ser. No. 09/685,199, filed Oct. 10, 2000, entitled A LOW POWER, HIGH RESOLUTION TIMING GENERATOR FOR ULTRA-WIDE BANDWIDTH COMMUNICATION SYSTEMS, now issued as U.S. Pat. No. 6,975,665.

The present document contains subject matter related to that disclosed in the following commonly owned, and U.S. patent applications: Ser. No. 09/209,460, filed Dec. 11, 1998, entitled ULTRA WIDE BANDWIDTH SPREAD-SPECTRUM COMMUNICATIONS SYSTEM, issued as U.S. Pat. No. 6,700,939; Ser. No. 09/633,815 filed Aug. 7, 2000, entitled ELECTRICALLY SMALL PLANAR UWB ANTENNA; Ser. No. 09/563,292 filed May 3, 2000, entitled PLANAR ULTRA WIDE BAND ANTENNA WITH INTEGRATED ELECTRONICS, issued as U.S. Pat. No. 6,351,246; Ser. No. 60/207,225 filed May 26, 2000, entitled ULTRAWIDEBAND COMMUNICATION SYSTEM AND METHOD; Ser. No. 09/685,198, filed Oct. 10, 2000, entitled ANALOG SIGNAL SEPARATOR FOR UWB VERSUS NARROWBAND SIGNALS, issued as U.S. Pat. No. 7,006,553; Ser. No. 60/238,466, filed Oct. 10, 2000, entitled ULTRA WIDE BANDWIDTH NOISE CANCELLATION MECHANISM AND METHOD; Ser. No. 60/217,099 filed Jul. 10, 2000, entitled MULTIMEDIA WIRELESS PERSONAL AREA NETWORK (WPAN) PHYSICAL LAYER SYSTEM AND METHOD; Ser. No. 09/685,203, filed Oct. 10, 2000, entitled SYSTEM AND METHOD FOR BASEBAND REMOVAL OF NARROWBAND INTERFERENCE IN ULTRA WIDEBAND SIGNALS, issued as U.S. Pat. No. 6,834,073; Ser. No. 09/685,197, filed Oct. 10, 2000, entitled MODE CONTROLLER FOR SIGNAL ACQUISITION AND TRACKING IN AN ULTRA WIDEBAND COMMUNICATION SYSTEM, issued as U.S. Pat. No. 6,965,630; Ser. No. 09/684,400, filed Oct. 10, 2000, entitled ULTRA WIDEBAND COMMUNICATION SYSTEM, METHOD, AND DEVICE WITH LOW NOISE PULSE FORMATION, issued as U.S. Pat. No. 6,735,238; Ser. No. 09/685,195, filed Oct. 10, 2000, entitled ULTRA WIDE BANDWIDTH SYSTEM AND METHOD FOR FAST SYNCHRONIZATION, issued as U.S. Pat. No. 6,925,108; Ser. No. 09/684,401, filed Oct. 10, 2000, entitled ULTRA WIDE BANDWIDTH SYSTEM AND METHOD FOR FAST SYNCHRONIZATION USING SUB CODE SPINS, issued as U.S. Pat. No. 6,967,993; Ser. No. 09/685,196, filed Oct. 10, 2000, entitled ULTRA WIDE BANDWIDTH SYSTEM AND METHOD FOR FAST SYNCHRONIZATION USING MULTIPLE DETECTION ARMS, issued as U.S. Pat. No. 7,079,604; Ser. No. 09/685,202, filed Oct. 10, 2000, entitled METHOD AND SYSTEM FOR ENABLING DEVICE FUNCTIONS BASED ON DISTANCE INFORMATION, issued as U.S. Pat. No. 7,058,414; Ser. No. 09/685,201, filed Oct. 10, 2000, entitled CARRIERLESS ULTRA WIDEBAND WIRELESS SIGNALS FOR CONVEYING APPLICATION DATA, issued as U.S. Pat. No. 6,505,032; Ser. No. 09/685,205, filed Oct. 10, 2000, entitled SYSTEM AND METHOD FOR GENERATING ULTRA WIDEBAND PULSES, issued as U.S. Pat. No. 7,010,056; Ser. No. 09/684,782, filed Oct. 10, 2000, entitled ULTRA WIDEBAND COMMUNICATION SYSTEM, METHOD, AND DEVICE WITH LOW NOISE RECEPTION, issued as U.S. Pat. No. 6,859,506; and Ser. No. 09/685,200, filed Oct. 10, 2000, entitled LEAKAGE NULLING RECEIVER CORRELATOR STRUCTURE AND METHOD FOR ULTRA WIDE BANDWIDTH COMMUNICATION SYSTEM, issued as U.S. Pat. No. 6,937,646, the entire contents of each of which being incorporated herein by reference.

BACKGROUND OF THE INVENTION

1. Field of the Invention

The present invention generally relates to radio frequency communication receivers, systems, and methods employing ultra-wide bandwidth (UWB) signaling techniques. More particularly, the present invention relates to a method, system and computer program product for ultra wide bandwidth communications using a low power, high-resolution, timing generator.

2. Discussion of the Background

In UWB communication systems, a UWB transceiver sends data to and receives data from a remote UWB transceiver. The UWB transceivers receive incoming signals and proceed to extract information therefrom. The clocks of the different UWB transceivers are usually not initially synchronized. Accordingly, in order to acquire accurately incoming signals, the timing of the UWB transceivers must be precisely synchronized (e.g., on the order of picoseconds). This function typically requires use of what is know as a "adjustable time delay generator" to provide highly accurate control for effectuating synchronized communications between UWB transceivers.

However, as presently recognized most UWB transceivers use high-speed time delay generator circuits implemented using high-speed, high-power and high-cost analog and digital devices using time domain techniques. These devices take an input trigger signal and generate an output trigger signal that is delayed by a programmable time relative to the input trigger signal. This is done, because most UWB transceivers are directed to pulse position modulation systems, leading most inventors to think only in terms of adjusting the time-position of a pulse by using time domain devices and techniques. Therefore, such circuits are built the way inventors typically think—pulse position equals time domain.

For example, Fullerton et al (U.S. Pat. No. 5,677,927 issued Oct. 14, 1997) disclose a timing generator based on variable delays and pulse positioning in the time domain. In this respect, background art FIGS. 19-21 correspond to respective FIGS. 23, 24 and 20 of Fullerton et al. As shown in FIG. 19, for example, a code time modulator element 1008 and sub-carrier time modulator 1016 are used. Similarly, in FIG. 20, for example, a binary-to-time-delay generator 2424 is used.

Accordingly, such exemplary inventions are working in the time domain, for example, throwing a switch to charge a capacitor to some threshold to toggle a gate (e.g., a 555 timer) and may include a digital-to-analog converter (DAC) to drive a comparator voltage (e.g., an Analog Devices AD9500). Thus, such time delay generators are built to program in a binary value and when hit with a trigger pulse the device waits a predetermined time before an output switch toggles in response thereto.

FIG. 21 shows a plot that illustrates problems associated with such time domain implementations. From FIG. 21, it is seen that such devices without error correction will delay across a range of about 300 picoseconds with errors on the order of 50 picoseconds. However, such devices must be programmable and repeatable to a few picoseconds. To correct for such errors, for example, in the circuit of FIG. 20 there is included a linearization ROM 2426. This ROM typically is custom programmed for each build to compensate for the non-repeatability of the analog circuits used in such time domain implementations. Cancellation of such errors over temperature is even more complicated, since drift must be cancelled as well.

To further complicate matters, a string of time delay devices, coarse to fine, is often used in order to cover an operational range of t1 to t2, where t2−t1 may be as long as hundreds of microseconds. In such a circuit, one device in the string provides the coarsest adjustment, and another device in the string provides the finest adjustment. However, such a string of devices must be monotonic and repeatable to a few picoseconds, which is difficult to achieve with such an implementation. Further, linearization of such a circuit over temperature and over a dynamic range of $10^5$ is time consuming and costly.

A further problem with the above-noted implementations, such as the invention of Fullerton et al, is that such systems suffer from jitter in the delay time. Each programmable delay circuit must use very high-speed transistors that exhibit very low noise in order for the output signal to trigger precisely at the threshold voltage or current. The problem, however, is that the threshold voltage and threshold-comparator circuits are noisy, and this noise causes the time delay to be inconsistent or, in other words, jitter. This jitter is especially difficult to control on the coarse control devices, because the delay changes by the largest amount proportional to the control signal. As a result, higher currents and expensive devices must be used. Therefore, to summarize, such systems typically require high power, are noisy, have linearity problems, and require custom manufacturing and tuning.

Accordingly, such conventional timing generator implementations typically are not well suited for many battery-operated, portable and hand held device applications, such as personal digital assistants (PDAs), cellular phones, lap top computers, etc. This is because such devices typically have fixed device circuitry, limited power supplies, limited circuit real estate and therefore must be implemented using low-power, low-cost devices.

Another problem with the above-noted implementations, such as the invention of Fullerton et al, is that such systems suffer from non-scalability. A scaled system allows for receiving signals at several different delay-times simultaneously, such as a rake processor receiver, wherein the receiver includes multiple arms to track signals coming from different multi-path locations. In FIG. 20, however, the system shown includes a binary-to-time delay generator 2424, linearization ROM 2426, programmable divider 2438 and voltage-controlled oscillator (VCO) 2440.

Accordingly, to implement a scaled system, using the time delay generator approach shown in FIG. 20, the entire set of devices typically must be duplicated. Therefore, the triggered waveform generator 2412, the binary-to-time delay generator 2424, the linearization ROM 2426, the programmable divider 2438, the VCO 2440, etc., typically have to be duplicated for every arm of the rake processor receiver. Accordingly, such implementations lead to complex, high power, high cost, devices not well suited for applications, such as personal digital assistants (PDAs), cellular phones, lap top computers, etc., that have fixed device circuitry, limited power supplies, and limited circuit real estate.

SUMMARY OF THE INVENTION

Accordingly, an object of this invention is to provide a novel method, system and computer program product for ultra wide bandwidth communication systems using a timing generator with decreased power, parts count, and cost, as compared to conventional devices, yet having very high linearity and dynamic range.

Another object of this invention is to provide a novel method, system and computer program product for ultra wide bandwidth communication systems using a timing generator that is not based on conventional time delay, which produces an output event that is delayed with respect to a reference-time event.

Another object of this invention is to provide a novel method, system and computer program product for ultra wide bandwidth communication systems using a timing generator that is divided into a section with higher power, high speed circuits including a high frequency clock portion and a vector modulator portion, and a section with very low power, low speed circuits including a low frequency control signal portion that can be quickly adjusted digitally and provides high linearity picosecond resolution control of output edge times.

Another object of this invention is to provide a novel method, system and computer program product for ultra wide bandwidth communication systems using a timing generator having a tuned high Q, low phase noise voltage controlled oscillator (VCO) and that provides an output signal whose jitter or phase noise is essentially equal to that of the tuned, high Q low phase noise voltage controlled oscillator (VCO), and is not governed by jittery circuitry in series with the VCO.

Another object of this invention is to provide a novel method, system and computer program product for ultra wide bandwidth communication systems using a timing generator having a tuned high Q low phase-noise voltage controlled oscillator in a high frequency clock portion that produces low jitter clock edges, a low frequency control portion that produces a control signal, and where the output signal is offset tuned from the low jitter high frequency clock signal using the low-frequency control signal.

Another object of this invention is to provide a novel method, system and computer program product for ultra wide bandwidth communication systems using a timing generator that is scalable having a single high-speed VCO and a single phase accumulator, so that multiple arms of a rake processor receiver can be implemented with minimal duplication of devices.

Another object of this invention is to provide a novel method, system and computer program product for ultra wide bandwidth communication systems using a timing generator that is scalable, duplicating only a vector modulator and a low frequency control generator in order to produce multiple, arbitrary time, output signals.

The above and other objects are achieved according to the present invention by providing a novel ultra wide bandwidth communications system, method and computer program product including an ultra wide bandwidth timing generator. The timing generator includes a high frequency clock generation circuit having low phase noise; a low frequency control generation circuit; and a modulation circuit coupled between the high frequency clock generation circuit and the low frequency control generation circuit. The high frequency clock generation circuit generates a plurality of high frequency clock signals. The low frequency control generation circuit generates a plurality of low frequency control signals. The modulation circuit modulates the high frequency clock signals with the low frequency control signals to produce an agile timing signal at a predetermined frequency and phase. The agile timing signal is generated at the predetermined frequency and phase by adjustments to at least one of frequency of the low frequency control signals, phase of the low frequency control signals, frequency of the high frequency clock signals, and phase of the high frequency clock signals.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a block diagram of a timing generator architecture used in the transceiver of FIG. 2, according to the present invention;

FIG. 4 is a block diagram of a timing generator architecture used in the transceiver of FIG. 2, according to another embodiment of the present invention;

FIG. 5 is a block diagram of a phase accumulator architecture used in the timing generator of FIGS. 3 and 4, according to the present invention;

FIG. 6 is a block diagram of a vector modulator architecture used in the timing generator of FIG. 3, according to the present invention;

FIG. 7 is a block diagram of a vector modulator architecture used in the timing generator of FIG. 4, according to the present invention;

FIG. 10 is a block diagram of the low frequency control signal generator of FIG. 8, according to another embodiment of the present invention;

FIG. 11 is a block diagram of the low frequency control signal generator of FIG. 9, according to another embodiment of the present invention;

DESCRIPTION OF THE PREFERRED EMBODIMENTS

Figure 1A:
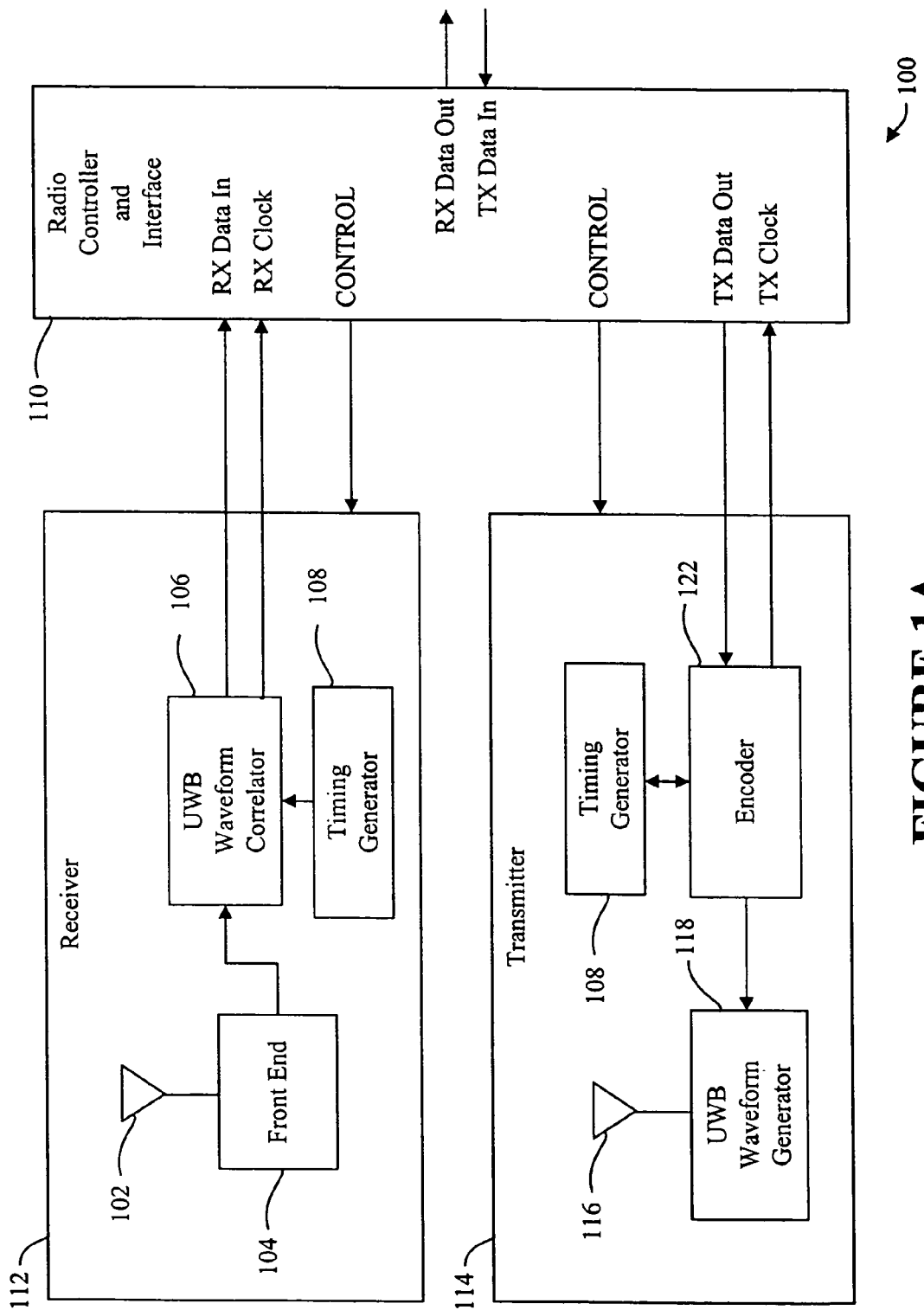
FIG. 1A is a block diagram of an ultra-wide band (UWB) transceiver, according to the present invention.

Referring now to the drawings, wherein like reference numerals designate identical or corresponding parts throughout the several views, and more particularly to FIGS. 1A-18 thereof, there are shown various embodiments of the present invention, as will now be described.

FIG. 1A is a block diagram of an ultra-wide band (UWB) transceiver 100. In FIG. 1A, the transceiver 100 includes three major components, namely, receiver 112, radio controller and interface 110, and transmitter 114. Alternatively, the system may be implemented as a separate receiver 112 and radio controller and interface 110, and a separate transmitter 114 and radio controller and interface 110. The radio controller and interface 110 serves as a media access control (MAC) interface between the UWB wireless communication functions implemented by the receiver 112 and transmitter 114 and applications that use the UWB communications channel for exchanging data with remote devices (e.g., as described with respect to FIG. 18).

The receiver 112 includes an antenna 102 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1,+a1, −a1, +a2, −a2, +aN, −aN), (iii) quadrature phase signals (+1, −1, +j, −j), (iv) multi-phase signals (1, −1, $\exp(+j\pi/N)$, $\exp(-j\pi/N)$, $\exp(+j\pi 2/N)$, $\exp(-j\pi 2/N)$, $\exp(+j(N-1)/N)$, $\exp(-j\pi(N-1)/N)$), (v) multilevel multi-phase signals ($a_i \exp(j2\pi\beta/N) | a_i \in \{1, a1, a2, aK\}, \beta \in \{0, 1, \ldots, N-1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in \{1, \ldots, M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}(t-T_i)$.

$$x(t) = \sum_{i=0}^{\infty} g_{B_i}(t - T_i) \tag{1}$$

In the above equation, the subscript i refers to the ith pulse in the sequence of UWB pulses transmitted or received. The wavelet function g has M possible shapes, and therefore $B_i$ represents a mapping from the data, to one of the M-ary modulation shapes at the ith pulse in the sequence. The wavelet generator hardware (e.g., the UWB waveform generator 118) has several control lines (e.g., coming from the radio controller and interface 110) that govern the shape of the wavelet. Therefore, $B_i$ can be thought of as including a lookup-table for the M combinations of control signals that produce the M desired wavelet shapes. The encoder 122 combines the data stream and codes to generate the M-ary states. Demodulation occurs in the waveform correlator 106 and the radio controller and interface 110 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2},B_{i,3},\ldots}(t) + Im(B_{i,1}) \cdot h_{B_{i,2},B_{i,3},\ldots}(t) \tag{2}$$

In the above equation, function f defines a basic wavelet shape, and function h is simply the Hilbert transform of the function f. The parameter $B_{i,1}$ is a complex number allowing the magnitude and phase of each wavelet pulse to be adjusted, i.e., $B_{i,1} = a_i \angle \theta_i$, where ai is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes f that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \tag{3}$$

In the above equation, the function $\Psi(\ )$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes f that are Gaussian weighted sinusoidal functions, as described by Equation 4 below.

$$f_{B_{i,2},B_{i,3},B_{i,4}} = f_{\omega_i,k_i,b_i}(t) = e^{-[b_i t]^2} \sin(\omega_i t + k_i t^2). \tag{4}$$

In the above equation, bi controls the pulse duration, ωi controls the center frequency, and ki controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes f that are inverse-exponentially weighted sinusoidal functions, as described by Equation 5 below.

$$g_{B_i}(t) = \left( \frac{1}{e^{\frac{-(t-t1_i)}{.3*t_{r_i}}} + 1} - \frac{1}{e^{\frac{-(t-t2_i)}{.3*t_{f_i}}} + 1} \right) \cdot \sin(\theta_i + \omega_i t + k_i t^2) \tag{5}$$

where $$\{B_{i,2}, B_{i,3}, B_{i,4}, B_{i,5}, B_{i,6}, B_{i,7}, B_{i,8}\} = \{t_{1_i}, t_{2_i}, t_{r_i}, t_{f_i}, \theta_i, \omega_i, k_i\}$$

In the above equation, the leading edge turn on time is controlled by $t_1$, and the turn-on rate is controlled by $t_r$. The trailing edge turn-off time is controlled by $t_2$, and the turn-off rate is controlled by $t_f$. Assuming the chirp starts at t=0 and $T_D$ is the pulse duration, the starting phase is controlled by θ, the starting frequency is controlled by ω, the chirp rate is controlled by k, and the stopping frequency is controlled by $\omega + kT_D$. An example assignment of parameter values is ω=1, $t_r = t_f = 0.25$, $t_1 = t_r/0.51$, and $t_2 = T_D - t_r/9$.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25f_c$ and toward $2f_c$. A key attribute of the exemplary wavelets (or e.g., those described in co-pending U.S. patent application Ser. No. 09/209,460, now issued as U.S. Pat. No. 6,700,939) is that the parameters are chosen such that neither f nor h in Equation 2 above has a DC component, yet f and h exhibit the required wide relative bandwidth for UWB systems.

Similarly, as a result of $B>0.25f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460, now issued as U.S. Pat. No. 6,700,939).

Figure 1B:
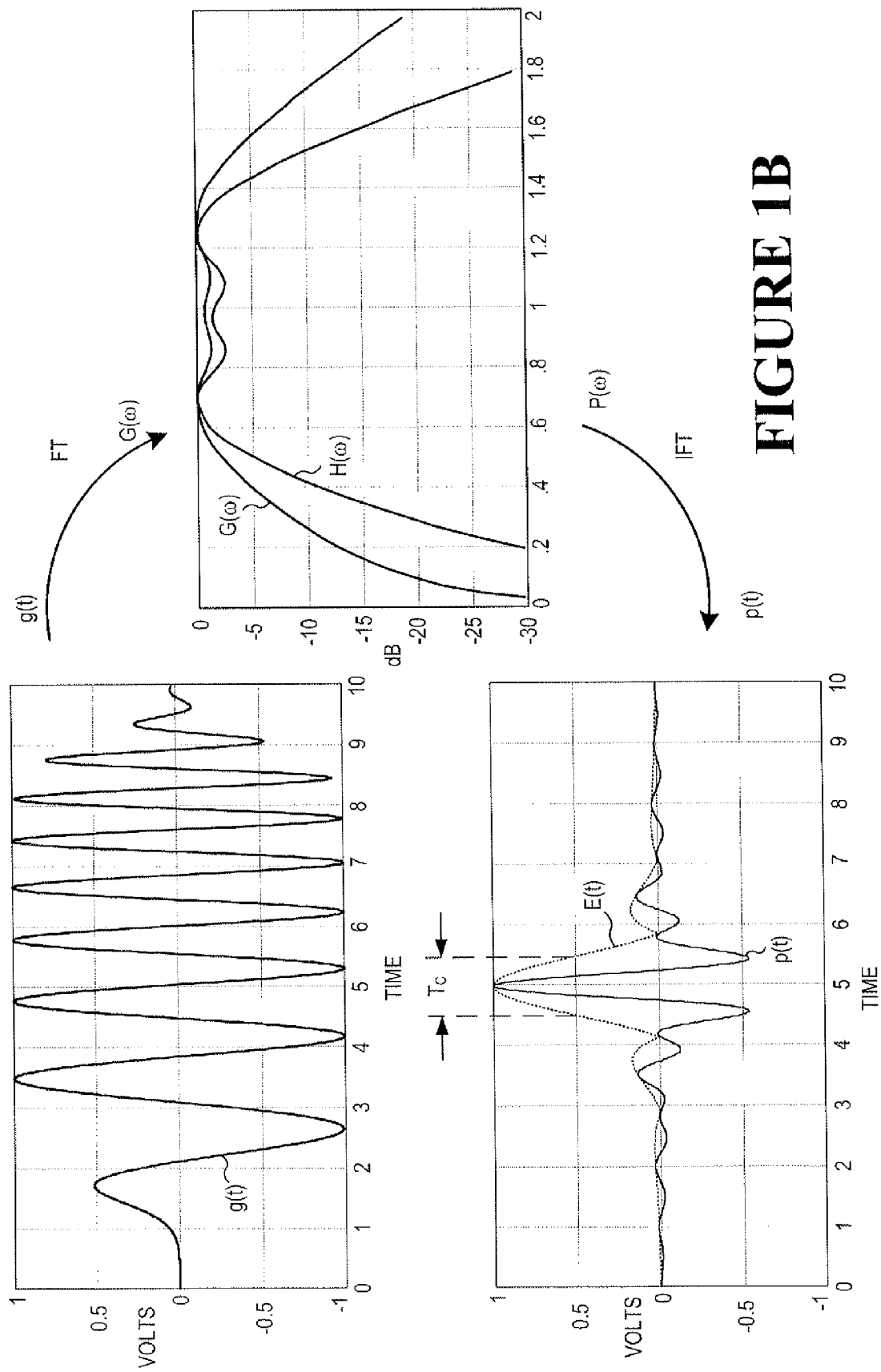
FIG. 1B is a diagram for illustrating the operation of the transceiver of FIG. 1A, according to the present invention.

The compressed (i.e., coherent matched filtered) pulse width of a UWB wavelet will now be defined with reference to FIG. 1B. In FIG. 1B, the time domain version of the wavelet thus represents g(t) and the Fourier transform (FT) version is represented by $G(\omega)$. Accordingly, the matched filter is represented as $G^*(\omega)$, the complex conjugate, so that the output of the matched filter is $P(\omega)=G(\omega)\cdot G^*(\omega)$. The output of the matched filter in the time domain is seen by performing an inverse Fourier transform (IFT) on $P(\omega)$ so as to obtain p(t), the compressed or matched filtered pulse. The width of the compressed pulse p(t) is defined by TC, which is the time between the points on the envelope of the compressed pulse E(t) that are 6 dB below the peak thereof, as shown in FIG. 1B. The envelope waveform E(t) may be determined by Equation 6 below.

$$E(t)=\sqrt{(p(t))^2+(p^H(t))^2} \qquad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1A, the electrical signals coupled in through the antenna 102 are passed to a radio front end 104. Depending on the type of waveform, the radio front end 104 processes the electric signals so that the level of the signal and spectral components of the signal are suitable for processing in the UWB waveform correlator 106. The UWB waveform correlator 106 correlates the incoming signal (e.g., as modified by any spectral shaping, such as a matched filtering, partially matched filtering, simply roll-off, etc., accomplished in front end 104) with different candidate signals generated by the receiver 112, so as to determine when the receiver 112 is synchronized with the received signal and to determine the data that was transmitted.

The timing generator 108 of the receiver 112 operates under control of the radio controller and interface 110 to provide a clock signal that is used in the correlation process performed in the UWB waveform correlator 106. Moreover, in the receiver 112, the UWB waveform correlator 106 correlates in time a particular pulse sequence produced at the receiver 112 with the receive pulse sequence that was coupled in through antenna 102 and modified by front end 104. When the two such sequences are aligned with one another, the UWB waveform correlator 106 provides high signal to noise ratio (SNR) data to the radio controller and interface 110 for subsequent processing. In some circumstances, the output of the UWB waveform correlator 106 is the data itself. In other circumstances, the UWB waveform correlator 106 simply provides an intermediate correlation result, which the radio controller and interface 110 uses to determine the data and determine when the receiver 112 is synchronized with the incoming signal.

In some embodiments of the present invention, when synchronization is not achieved (e.g., during a signal acquisition mode of operation), the radio controller and interface 110 provides a control signal to the receiver 112 to acquire synchronization. In this way, a sliding of a correlation window within the UWB waveform correlator 106 is possible by adjustment of the phase and frequency of the output of the timing generator 108 of the receiver 112 via a control signal from the radio controller and interface 110. The control signal causes the correlation window to slide until lock is achieved. The radio controller and interface 110 is a processor-based unit that is implemented either with hard wired logic, such as in one or more application specific integrated circuits (ASICs) or in one or more programmable processors (e.g. as described with respect to FIG. 18).

Once synchronized, the receiver 112 provides data to an input port ("RX Data In") of the radio controller and interface 110. An external process, via an output port ("RX Data Out") of the radio controller and interface 110, may then use this data (e.g. as described with respect to FIG. 18). The external process may be any one of a number of processes performed with data that is either received via the receiver 112 or is to be transmitted via the transmitter 114 to a remote receiver (e.g. as described with respect to FIG. 18).

During a transmit mode of operation, the radio controller and interface 110 receives source data at an input port ("TX Data In") from an external source. The radio controller and interface 110 then applies the data to an encoder 122 of the transmitter 114 via an output port ("TX Data Out"). In addition, the radio controller and interface 110 provides control signals to the transmitter 114 for use in identifying the signaling sequence of UWB pulses. In some embodiments of the present invention, the receiver 112 and the transmitter 114 functions may use joint resources, such as a common timing generator and/or a common antenna, for example. The encoder 122 receives user coding information and data from the radio controller and interface 110 and preprocesses the data and coding so as to provide a timing input for the UWB waveform generator 118, which produces UWB pulses encoded in shape and/or time to convey the data to a remote location.

The encoder 122 produces the control signals necessary to generate the required modulation. For example, the encoder 122 may take a serial bit stream and encode it with a forward error correction (FEC) algorithm (e.g., such as a Reed Solomon code, a Golay code, a Hamming code, a Convolutional code, etc.). The encoder 122 may also interleave the data to guard against burst errors. The encoder 122 may also apply a whitening function to prevent long strings of "ones" or "zeros." The encoder 122 may also apply a user specific spectrum spreading function, such as generating a predetermined length chipping code that is sent as a group to represent a bit (e.g., inverted for a "one" bit and non-inverted for a "zero" bit, etc.). The encoder 122 may divide the serial bit stream into subsets in order to send multiple bits per wavelet or per chipping code, and generate a plurality of control signals in order to affect any combination of the modulation schemes as described above (and/or as described in Latin).

The radio controller and interface 110 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIGS. 2, 4, 12, 13, 16 and 17, as a way of impressing the encoding onto the signal.

The output from the encoder 122 is applied to a UWB waveform generator 118. The UWB waveform generator 118 produces a UWB pulse sequence of pulse shapes at pulse times according to the command signals it receives, which may be one of any number of different schemes. The output from the UWB generator 118 is then provided to an antenna 116, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 114, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 2:
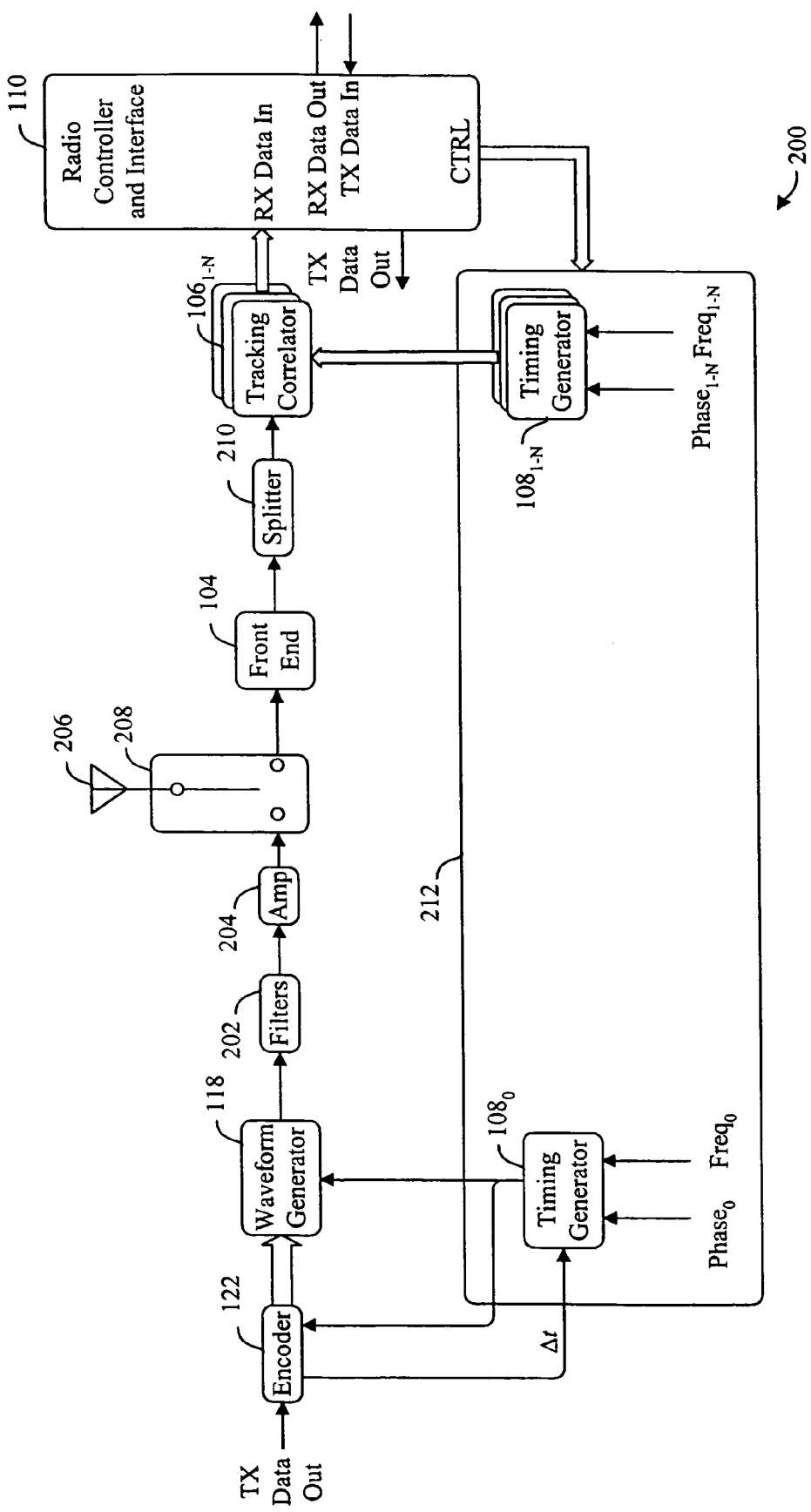
FIG. 2 is a block diagram of the transceiver of FIG. 1A, that manipulates a shape of UWB pulses, according to the present invention.

FIG. 2 is a block diagram of a transceiver embodiment of the present invention in which the modulation scheme employed is able to manipulate the shape and time of the UWB pulses. In FIG. 2, when receiving energy through the antenna 206 (e.g., corresponding antennas 102 and 116 of FIG. 1A) the energy is coupled in to a transmit/receive (T/R) switch 208, which passes the energy to a radio front end 104. The radio front end 104 filters, extracts noise, and adjusts the amplitude of the signal before providing the same to a splitter 210. The splitter 210 divides the signal up into one of N different signals and applies the N different signals to different tracking correlators $106_1$-$106_N$. Each of the tracking correlators $106_1$-$106_N$ receives a clock input signal from a respective timing generator $108_1$-$108_N$ of a timing generator module 212, as shown in FIG. 2.

The timing generators $108_1$-$108_N$, for example, receive a phase and frequency adjustment signal, as shown in FIG. 2, but may also receive a fast modulation signal, as will be described with respect to FIGS. 4, 12, 12, 16, and 17 or other control signal(s) as well. The radio controller and interface 110 provides the control signals, such as phase, frequency and fast modulation signals, etc., to the timing generator module 212, for time synchronization and modulation control. The fast modulation control signal may be used to implement, for example, chirp waveforms, PPM waveforms, such as fast time scale PPM waveforms, etc.

The radio controller and interface 110 also provides control signals to, for example, the encoder 122, the waveform generator 118, the filters 202, the amplifier 204, the T/R switch 208, the front end 104, the tracking correlators $106_1$-$106_N$ (corresponding to the UWB waveform correlator 106 of FIG. 1A), etc., for controlling, for example, amplifier gains, signal waveforms, filter passbands and notch functions, alternative demodulation and detecting processes, user codes, spreading codes, cover codes, etc.

During signal acquisition, the radio controller and interface 110 adjusts the phase input of, for example, the timing generator $108_1$, in an attempt for the tracking correlator $106_1$ to identify and the match the timing of the signal produced at the receiver with the timing of the arriving signal. When the received signal and the locally generated signal coincide in time with one another, the radio controller and interface 110 senses the high signal strength or high SNR and begins to track, so that the receiver is synchronized with the received signal.

Once synchronized, the receiver will operate in a tracking mode, where the timing generator $108_1$ is adjusted by way of a continuing series of phase adjustments to counteract any differences in timing of the timing generator $108_1$ and the incoming signal. However, a feature of the present invention is that by sensing the mean of the phase adjustments over a known period of time, the radio controller and interface 110 adjusts the frequency of the timing generator $108_1$ so that the mean of the phase adjustments becomes zero. The frequency is adjusted in this instance because it is clear from the pattern of phase adjustments that there is a frequency offset between the timing generator $108_1$ and the clocking of the received signal. Similar operations may be performed on timing generators $108_2$-$108_N$, so that each receiver can recover the signal delayed by different amounts, such as the delays caused by multipath (i.e., scattering along different paths via reflecting off of local objects).

A feature of the transceiver in FIG. 2 is that it includes a plurality of tracking correlators $106_1$-$106_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 110 receives the information from the different tracking correlators $106_1$-$106_N$ and decodes the data. The radio controller and interface 110 also provides control signals for controlling the front end 104, e.g., such as gain, filter selection, filter adaptation, etc., and adjusting the synchronization and tracking operations by way of the timing generator module 212.

Figure 18:
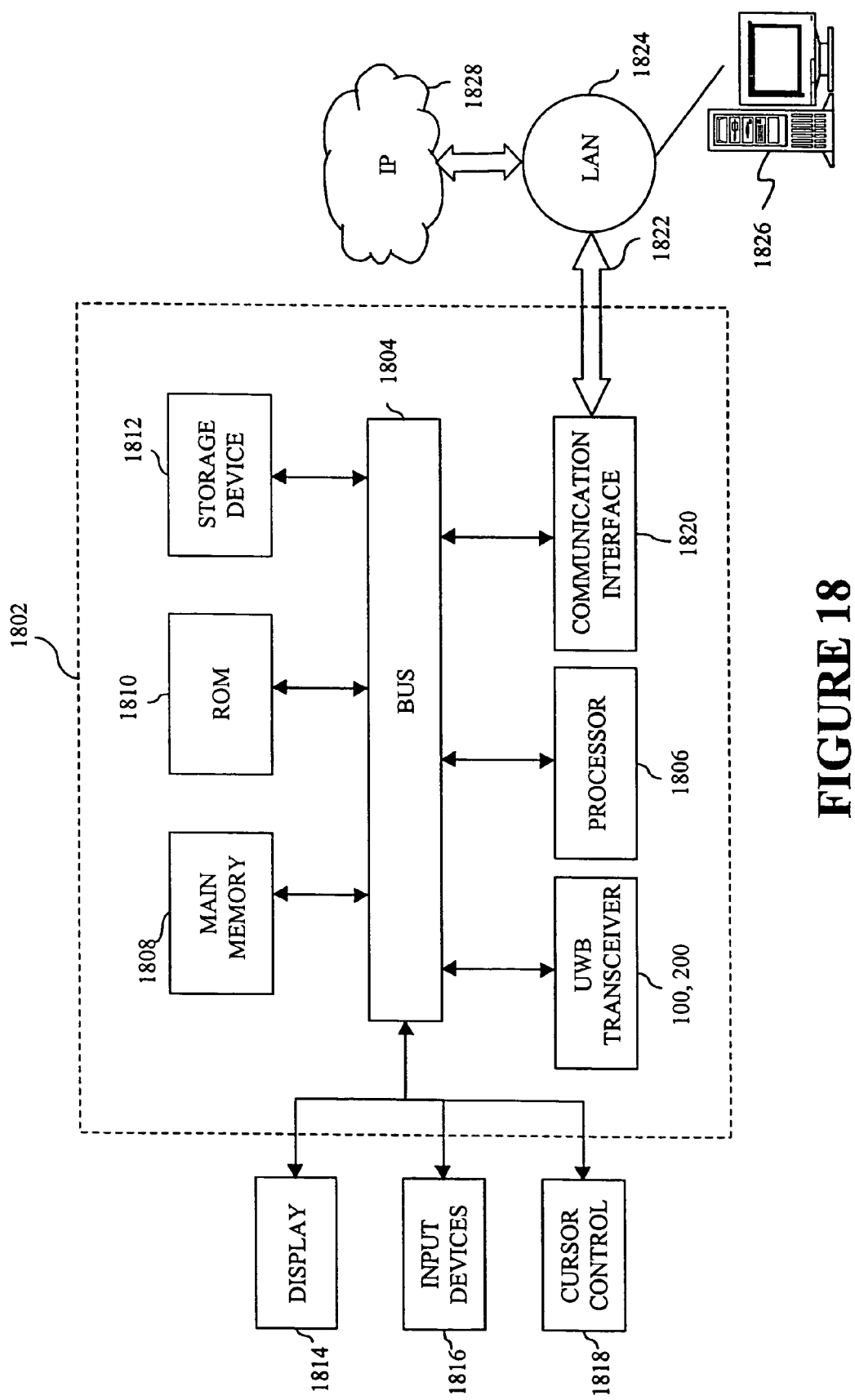
FIG. 18 is a schematic illustration of a general-purpose microprocessor-based or digital signal processor-based system, which can be programmed according to the teachings of the present invention.
Figure 19:
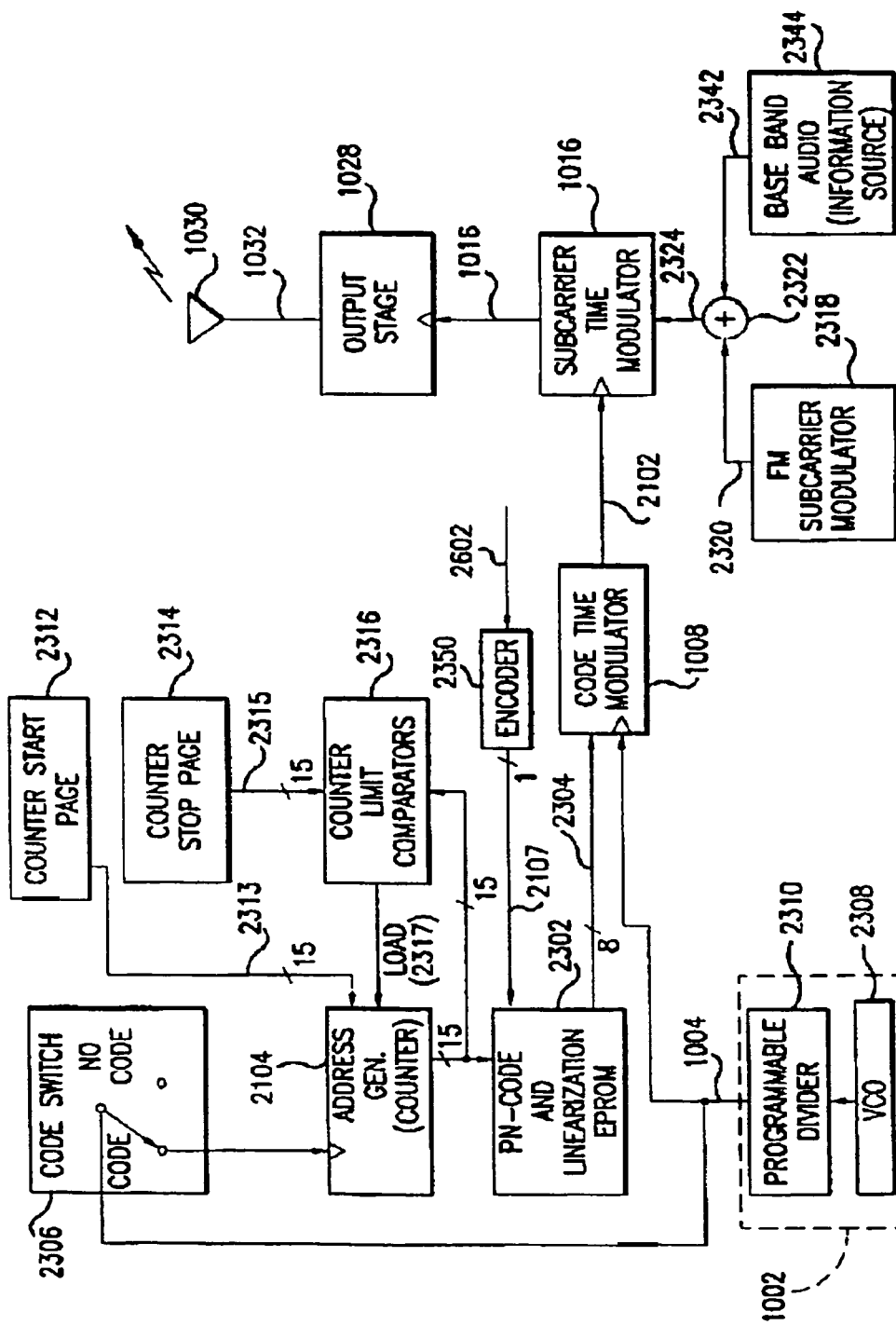
FIG. 19 is a background art block diagram corresponding to FIG. 23 of U.S. Pat. No. 5,677,927.
Figure 20:
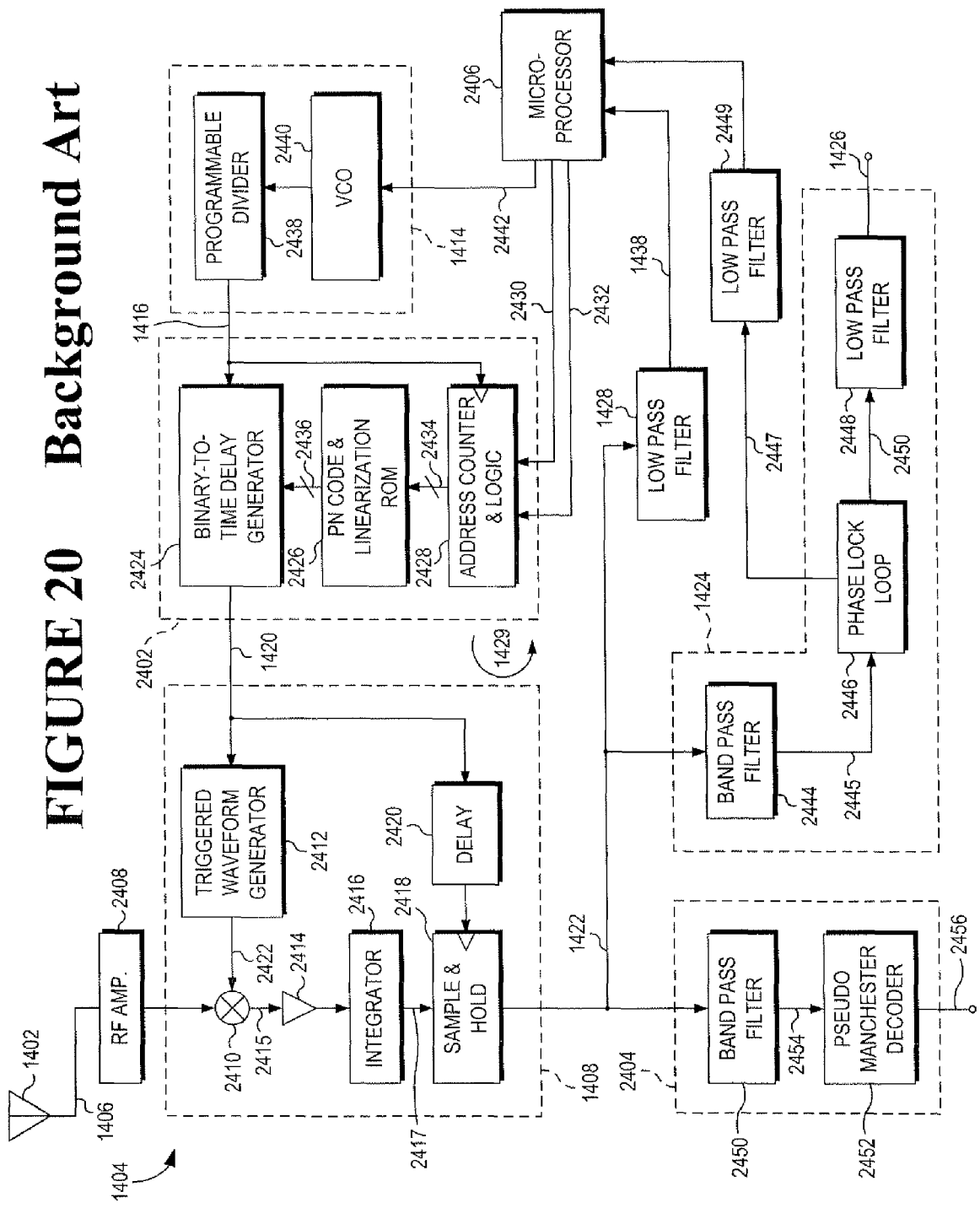
FIG. 20 is a background art block diagram corresponding to FIG. 24 of U.S. Pat. No. 5,677,927.
Figure 21:
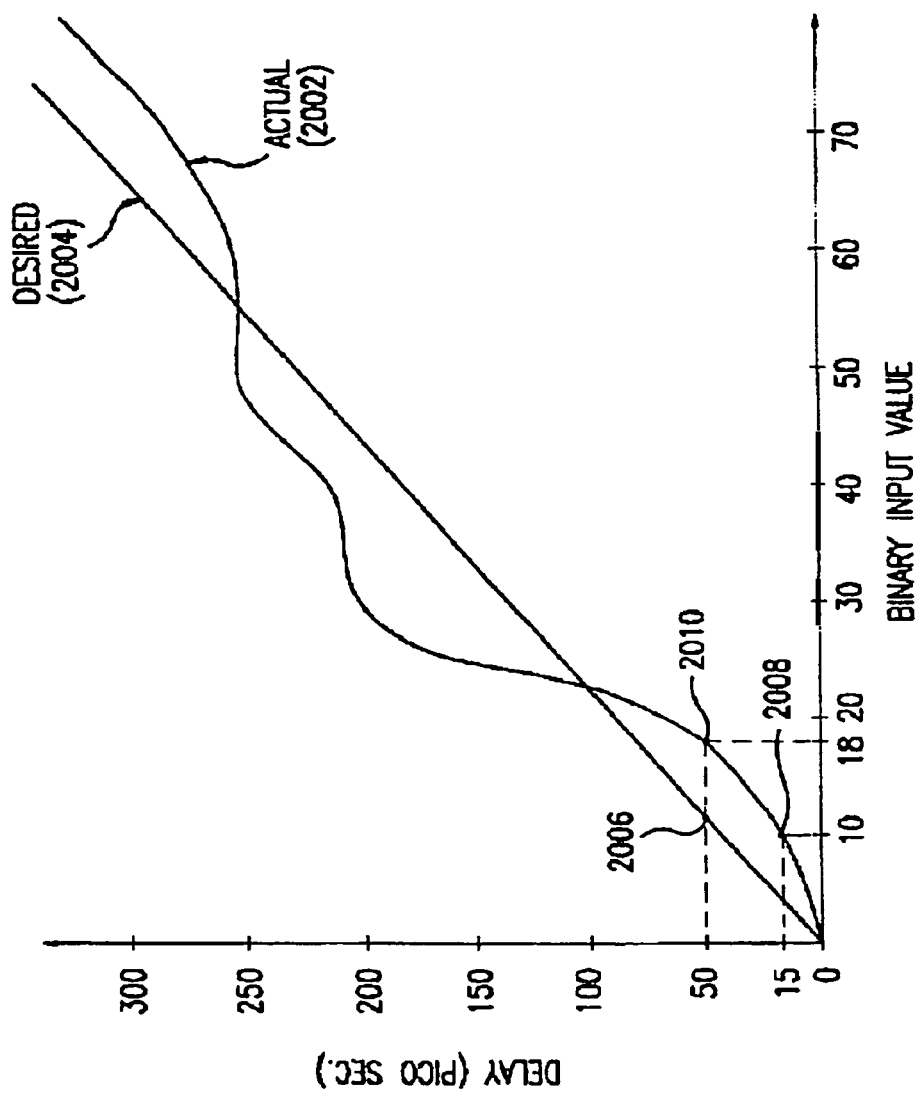
FIG. 21 is a background art plot of errors in time domain implementations corresponding to FIG. 20 of U.S. Pat. No. 5,677,927.

In addition, the radio controller and interface 110 serves as an interface between the communication link feature of the present invention and other higher level applications that will use the wireless UWB communication link for performing other functions (e.g. as described with respect to FIG. 18). Some of these functions would include, for example, performing range-finding operations, wireless telephony, file sharing, personal digital assistant (PDA) functions, embedded control functions, location-finding operations, etc. (e.g. as described with respect to FIG. 18).

On the transmit portion of the transceiver 200 shown in FIG. 2, a timing generator 1080 also receives phase, frequency and/or fast modulation adjustment signals for use in encoding a UWB waveform from the radio controller and interface 110. Data and user codes (via a control signal) are provided to the encoder 122, which in the case of an embodiment of the present invention utilizing time-modulation, passes command signals (e.g., Δt) to the timing generator 1080 for providing the time at which to send a pulse. In this way, encoding of the data into the transmitted waveform may be performed.

When the shape of the different pulses are modulated according to the data and/or codes, the encoder 122 produces the command signals as a way to select different shapes for generating particular waveforms in the waveform generator 118. For example, the data may be grouped in multiple data bits per channel symbol. The waveform generator 118 then produces the requested waveform at a particular time as indicated by the timing generator 1080. The output of the waveform generator is then filtered in filter 202 and amplified in amplifier 204 before being transmitted via antenna 206 by way of the T/R switch 208.

In another embodiment of the present invention, the transmit power is set low enough that the transmitter and receiver are simply alternately powered down without need for the T/R switch 208. Also, in some embodiments of the present invention, neither the filter 202 nor the amplifier 204 is needed, because the desired power level and spectrum is directly useable from the waveform generator 118. In addition, the filters 202 and the amplifier 204 may be included in the waveform generator 118 depending on the implementation of the present invention.

A feature of the UWB communications system 200, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 206, such that the amplifier 204 is not required. In this way, the entire radio can be integrated on a single monolithic integrated circuit.

Under certain operating conditions, the system can be operated without the filters 202. If, however, the system is to be operated, for example, with another radio system, the filters 202 can be used to provide a notch function to limit interference with other radio systems. In this way, the system can operate simultaneously with other radio systems, providing advantages over conventional devices that use avalanching type devices connected straight to an antenna, such that it is difficult to include filters therein.

FIG. 3 is a block diagram of a timing generator architecture used in the transceiver of FIG. 2. In FIG. 3, the timing generator module 212 includes a high frequency clock 302, vector modulators $304_{0-N}$, low frequency control generators $306_{0-N}$ and a phase accumulator 324. The high frequency clock 302 provides 0° and 90° phase-shifted versions of a high frequency clock signal (e.g., a 1.6 GHz sinusoidal signal). A feature of the present invention is that the timing generator module 212 is partitioned into high frequency, high-power circuit functions (and circuitry) and low frequency, low-power circuit functions (and circuitry), as compared to conventional devices. The high frequency, high-power circuit functions include the functions performed by the high frequency clock 302 and the vector modulators $304_{0-N}$. The low frequency, low-power circuit functions include the functions performed by the low frequency control generators $306_{0-N}$ and the phase accumulator 324.

Accordingly, the high frequency, high-power circuit functions can be implemented using, for example, high frequency, high-power, emitter coupled logic (ECL) and analog devices. On the other hand, the low frequency, low-power circuit functions can be implemented using, for example, low frequency, low-power digital and CMOS devices, resulting in power and cost savings, as compared to conventional devices. Thus, the timing generator module 212 architecture reduces the power requirements and the cost of manufacturing of such devices, as compared to conventional devices, which typically only use high frequency, high-power devices to implement such a function.

The operation of the timing generator module 212 of FIG. 3 works as follows. The high frequency clock 302 provides the 0° and 90° high-frequency clock signals 308 and 310 to the vector modulators $304_{0-N}$. The low frequency control generators $306_{0-N}$, which can be clocked at any desired rate and are shown clocked at a clock reference frequency (e.g., 10 MHz) via signals 320, provide 0° and 90° sinusoidal control signals as signals 312 and 314 (e.g., sin(θ) and cos(θ), where θ is a desired phase), respectively, to the vector modulators $304_{0-N}$. The vector modulators $304_{0-N}$ use the control signals 312 and 314 for adjusting the phase and frequency of the signals 322 output by the vector modulators $304_{0-N}$. The low frequency control generators $306_{0-N}$ receive a ramping phase adjustment signal 316 ("RPhase") from the phase accumulator 324 and receive phase adjustment signals 318 ("$Phase_{0-N}$," e.g., 8-bits) from the radio controller and interface 110.

The phase accumulator 324 can be clocked at any desired rate and is shown clocked at the clock reference 302a frequency via the signal 320. The phase accumulator 324 receives a control signal 326 ("Fine Freq," e.g., of N-bits, where N provides the desired frequency resolution and may be implemented using, e.g., 48-bits) from the radio controller and interface 110 in order to generate the ramping phase adjustment signal 316 ("RPhase"). The high frequency clock 302 receives a control signal 302a ("Coarse Freq," e.g., 32-bits) and a control signal 332 ("Fast Modulation," e.g., an odd/even square wave of variable amplitude aligned to the bit time) from the radio controller and interface 110 in order to generate the signals 308 and 310. By splitting the timing generator module 212 architecture into the high frequency clock 302 portion and the low frequency control generators $306_{0-N}$ portion, it is possible to use the accurate low frequency control generators $306_{0-N}$ signals 312 and 314 to move the position of the zero-crossings of high frequency clock signals 308 and 310 so that the resultant timing generator signals 322 are precisely positioned.

FIG. 4 is a block diagram of a timing generator architecture used in the transceiver of FIG. 2, according to another embodiment of the present invention. In FIG. 4, the timing generator module 212 includes a high frequency clock 402, vector modulators $404_{0-N}$, low frequency control generators $406_{0-N}$ and a phase accumulator 324. The high frequency clock 402 provides 0°, 120° and 240° phase-shifted versions of a high frequency clock signal (e.g., a 1.6 GHz sinusoidal signal). A feature of the present invention is that the timing generator module 212 is partitioned into high frequency, high-power circuit functions (and circuitry) and low frequency, low-power circuit functions (and circuitry), as compared to conventional devices. The high frequency, high-power circuit functions include the functions performed by the high frequency clock 402 and the vector modulators $404_{0-N}$. The low frequency, low-power circuit functions include the functions performed by the low frequency control generators $406_{0-N}$ and the phase accumulator 324.

Accordingly, the high frequency, high-power circuit functions can be implemented using, for example, high frequency, high-power, emitter coupled logic (ECL) and analog devices. On the other hand, the low frequency, low-power circuit functions can be implemented using, for example, low frequency, low-power digital and CMOS devices, resulting in power and cost savings, as compared to conventional devices. Thus, the timing generator module 212 architecture reduces the power requirements and the cost of manufacturing of such devices, as compared to conventional devices, which typically only use high frequency, high-power devices to implement such a function.

The operation of the timing generator module 212 of FIG. 4 works as follows. The high frequency clock 402 provides the 0°, 120° and 240° high-frequency clock signals 408, 430 and 410 to the vector modulators $404_{0-N}$. The low frequency control generators $406_{0-N}$, which can be clocked at any desired rate and are shown clocked at a clock reference frequency (e.g., 10 MHz) via signals 320, provide control signals 412, 428 and 414 to the vector modulators $404_{0-N}$. The vector modulators $404_{0-N}$ use the control signals 412, 428 and 414 for adjusting the phase and frequency of the signals 422 output by the vector modulators $404_{0-N}$. The low frequency control generators $406_{0-N}$ receive a ramping phase adjustment signal 316 ("RPhase") from the phase accumulator 324 and receive phase adjustment signals 318 ("$Phase_{0-N}$," e.g., 8-bits) from the radio controller and interface 110 (FIG. 2). The phase accumulator 324 is clocked at any desired rate and is shown clocked at the clock reference frequency via the signal 320. The phase accumulator 324 receives a control signal 326 ("Fine Freq," e.g., of N-bits, where N provides the desired frequency resolution and may be implemented using, e.g., 48-bits) from the radio controller and interface 110 in order to generate the ramping phase adjustment signal 316 ("RPhase"). The high frequency clock 402 receives a control signal 302a ("Coarse Freq," e.g., 32-bits) and control signal 332 ("Fast Modulation," e.g., an odd/even square wave of variable amplitude aligned to the bit time) from the radio controller and interface 110 in order to generate the signals 408, 430 and 410. By splitting the timing generator module 212 architecture into the high frequency clock 402 portion and the low frequency clocks $406_{0-N}$ portion, it is possible to use the accurate low frequency control generators $406_{0-N}$ signals 412, 428 and 414 to modulate (or mix) the position of the high frequency clock signals 408, 430 and 410 so that the resultant timing generator signals 322 are precisely positioned.

FIG. 5 is a block diagram of a phase accumulator architecture used in the timing generator of FIGS. 3 and 4, according to the present invention. In FIG. 5, the phase accumulator 324 is clocked via signal 320 and includes a register 502 (e.g., 48-bit) and an adder 504. With the noted construction, the phase accumulator generates a ramp function on the signal lines 316, where the ramp rate is based on both the input signal 326 ("Fine Freq") received from the radio controller and interface 110, and the signal 320 clock rate. The phase accumulator 324 may be clocked at any desired rate and is shown clocked at the clock reference frequency via the signal 320. A predetermined number of the most significant bits (MSBs) of the register 502 (e.g., the 8 MSBs) are provided on the signal lines 316.

FIG. 6 is a block diagram of a vector modulator architecture used in the timing generator of FIG. 3, according to the present invention. In FIG. 6, the vector modulators $304_{0-N}$ include mixers 602 and 604 (e.g., have a range of [−1 . . . +1], where [ ] means inclusive) and summer 606 and generate signals 322. The mixers 602 and 604 receptively modulate the high-frequency signals 308 and 310 with the low-frequency signals 312 and 314 and provide a sum thereof via the summer 606 as the signals 322. In this way, precise phase and frequency adjustments of the signals 322 are achieved so that the zero crossings are precisely timed under control of the radio controller and interface 110.

FIG. 7 is a block diagram of a vector modulator architecture used in the timing generator of FIG. 4, according to the present invention. In FIG. 7, the vector modulators $404_{0-N}$ include variable gain elements 702, 704 and 708 (e.g., having a gain of [0 . . . 1]) and summer 706 and generate signals 422. The mixers 702, 704 and 708 respectively modulate the high-frequency signals 408, 430 and 410 with the low-frequency signals 412, 428 and 414 and provide a sum thereof via the summer 706 as the signals 422. In this way, precise phase and frequency adjustments of the signals 422 are achieved so that the zero crossings are precisely timed under control of the radio controller and interface 110. The above implementation is advantageous, since each of the variable gain elements is simple and can be implemented via a single variable resistor, a single transistor, a signal gain element, a single operational amplifier, etc.

Figure 8:
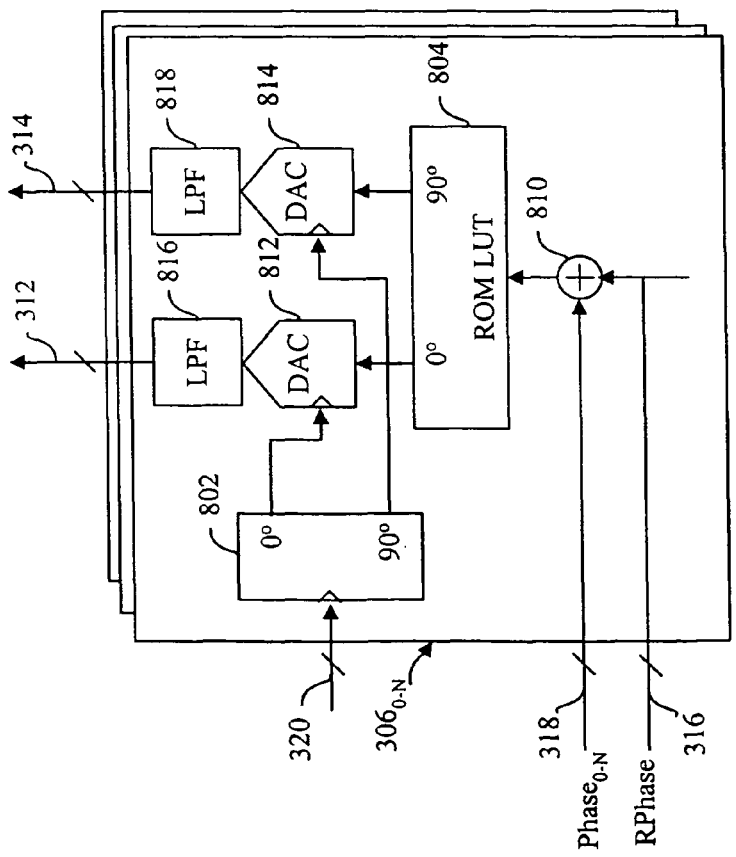
FIG. 8 is a block diagram of a low frequency control signal generator used in the timing generator of FIG. 3, according to the present invention.

FIG. 8 is a block diagram of a low frequency control generator used in the timing generator of FIG. 3, according to the present invention. In FIG. 8, the low frequency control generators $306_{0-N}$ include quadrature network 802, low-pass filters (LPFs) 816 and 818, digital-to-analog converters (DACs) 812 and 814, ROM look-up table (LUT) 804 and adder 810. The adder 810 sums the signals 318 and 316 and the sum is provided to the ROM LUT 804, which generates phase and frequency adjustment signals to the DACs 812 and 814. The DACs 812 and 814 are clocked with 0° and 90° phase shifted versions of the clock signals 320 via the quadrature network 802. The output from the DACs 812 and 814 are then filtered via LPFs 816 and 818 to generate the phase and frequency adjustment signals 312 and 314.

The characteristic equations for determining the values stored in the ROM LUT 804 will now be described. The ROM LUT 804 has two outputs 0° and 90°, which provide $\sin(\theta_i) + \epsilon_{1i}$ and $\cos(\theta_i) + \epsilon_{2i}$ as signals 312 and 314, respectively, where $\theta_i$ is a desired phase (i.e., the input to the ROM LUT 804). The signals 308 and 310 correspond to $\sin(\omega t + 0°)$ and $\sin(\omega t + 90° + \epsilon)$, respectively. Thus, the signal 322 ($S_{322}$) is given by Equation 7 below.

$$S_{322} = \cos(\theta)\sin(\omega t + 0°) + \sin(\theta)\sin(\omega t + 90° + \epsilon) \quad (7)$$

In the above equation, $\epsilon$ is a possible error that can be compensated for by $\epsilon_1$ and $\epsilon_2$. Given the desired phase $\theta$ (i.e., the input to the ROM LUT 804) and solving the above equation, the values for the ROM LUT 804 can be determined for a given θ.

The ROM LUT 804 may be decreased in size by one half by only storing one half of a sine wave and cosine wave for the 0° and 90° outputs and by providing logic to provide a sign bit the DACs 812 and 814. The sign bit indicates which half of the wave cycle is being output for inversion or non-inversion of the output of the ROM LUT 804 by the DACs 812 and 814. In a similar, manner the ROM LUT 804 may be decreased in size by one fourth by only storing one fourth of a sine wave and cosine wave for the 0° and 90° outputs. This may be accomplished by providing appropriate logic for outputting control signals for indicating which quadrant of the sine wave and cosine wave for the 0° and 90° outputs is being output and adjusting the operation of the DACs 812 and 814 and the ROM LUT 804 accordingly.

Figure 9:
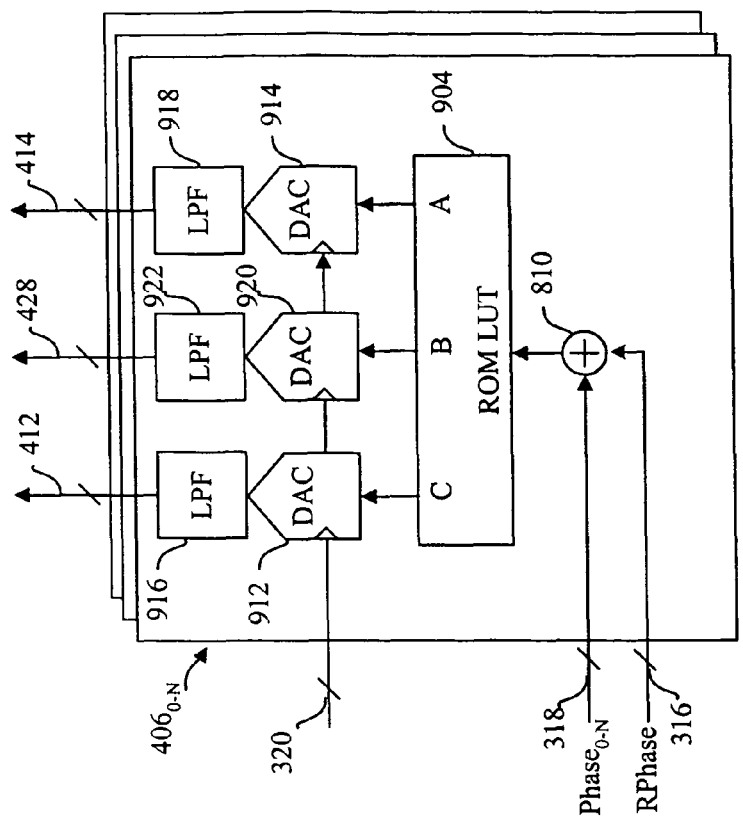
FIG. 9 is a block diagram of a low frequency control signal generator used in the timing generator of FIG. 4, according to the present invention.

FIG. 9 is a block diagram of a low frequency control generator used in the timing generator of FIG. 4, according to the present invention. In FIG. 9, the low frequency control generators 406$_{0\text{-}N}$ include low-pass filters (LPFs) 916, 922 and 918, digital-to-analog converters (DACs) 912, 920 and 914, ROM look-up table (LUT) 904 and adder 810. The adder 810 sums the signals 318 and 316 and the sum is provided to the ROM LUT 904, which generates phase and frequency adjustment signals to the DACs 912, 920 and 914. The DACs 912, 920 and 914 are clocked by the clock signals 320. The output from the DACs 912, 920 and 914 are then filtered via LPFs 916, 922 and 918 to generate the phase and frequency adjustment signals 412, 428 and 414.

The characteristic equations for determining the values stored in the ROM LUT 904 will now be described. The ROM LUT 904 has three outputs A, B and C and the signals 408, 430 and 410 correspond to sin(ωt+0°), sin(ωt+120°) and sin(ωt+240°), respectively. Thus, the signal 422 ($S_{422}$) is given by Equation 8 below.

$$S_{422}=A\sin(\omega t+0°)+B\sin(\omega t+120°+\epsilon_1)+C\sin(\omega t+240°+\epsilon_2) \quad (8)$$

In the above equation, $\epsilon_1$ and $\epsilon_2$ are possible errors. Given a desired phase θ (i.e., the input to the ROM LUT 904), then Equations 9 and 10 below result.

$$\sin(\theta)=A+B\sin(120°+\epsilon_1)+C\sin(240°+\epsilon_2) \quad (9)$$

$$\cos(\theta)=B\cos(120°+\epsilon_1)+C\cos(240°+\epsilon_2) \quad (10)$$

By splitting θ in the above equations into three ranges (i.e., 0° to 120°+$\epsilon_1$, where C=0; 120°+$\epsilon_1$ to 240°+$\epsilon_2$, where A=0; and 240°+$\epsilon_2$ to 360°, where B=0;) and solving for A, B and C for a given θ, the values for the ROM LUT 904 can be determined.

FIG. 10 is a block diagram of the low frequency control generator of FIG. 8, according to another embodiment of the present invention. In FIG. 10, the low frequency control generators 306$_{0\text{-}N}$ generate the same signals 312 and 314 of FIG. 8, but advantageously require only a single DAC 1006. Accordingly, the DACs 812 and 814 of FIG. 8 are replaced with a single DAC 1006, sample-and-hold circuits 1002 and 1004, multiplexer (MUX) 1008 and logic 1010 (e.g., an exclusive OR) for clocking the DAC 1006 and controlling the MUX 1008 at twice the frequency (e.g., 20 MHz) of the signal 320 frequency (e.g., 10 MHz).

FIG. 11 is a block diagram of the low frequency control generator of FIG. 9, according to another embodiment of the present invention. In FIG. 11, the low frequency control generators 406$_{0\text{-}N}$ generate the same signals 412, 428 and 414 of FIG. 9, but advantageously require only a single DAC 1106.

Accordingly, the DACs 912, 920 and 914 of FIG. 9 are replaced with a single DAC 1106, a 0°, 90°, 180° and 270° phasing network 1114, a first set of sample-and-hold circuits 1112, 1102 and 1104, a second set of sample-and-hold circuits 1116, 1118 and 1120, multiplexer 1108 and logic 1110. The 0°, 90°, 180° and 270° phasing network 1114 generates short pulses or leading edges at a predetermined frequency (e.g., 10 MHz) with the noted phase relationships. The first set of sample-and-hold circuits 1112, 1102 and 1104 are respectively clocked with the 0°, 90°, 180° pulses or edges, while the second set of sample-and-hold circuits 1116, 1118 and 1120 are all clocked with the 270° pulse or edge. The DAC 1106 is effectively clocked at, for example, 30 MHz via the logic 1110, which clocks the DAC 1106 on the leading edges of the 0°, 90°, and 180° pulses to clock the DAC 1106 and provides appropriate control signals to the MUX 1108.

Figure 12:
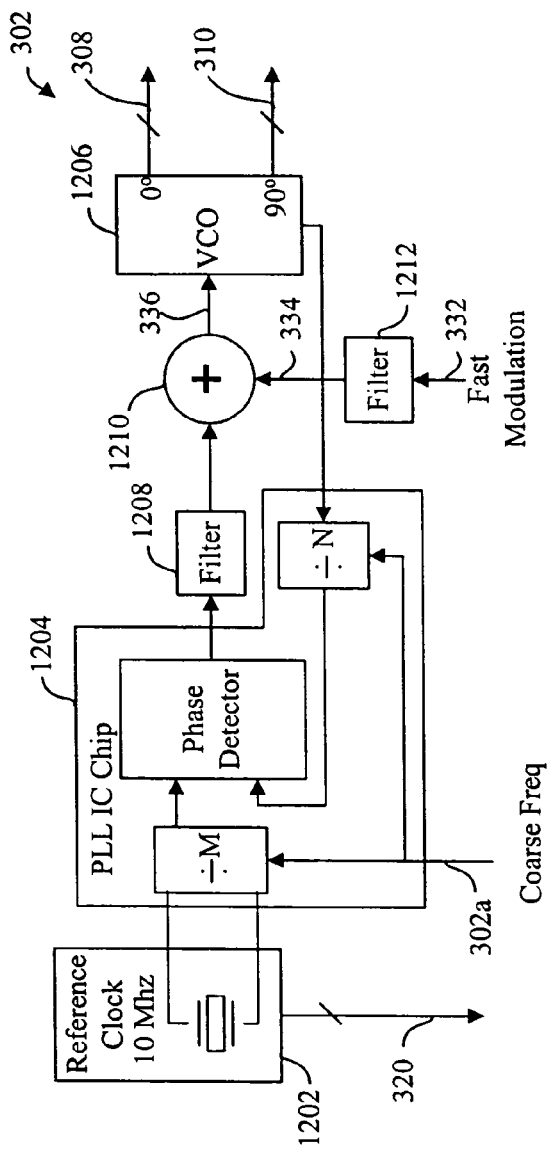
FIG. 12 is a block diagram of a high frequency clock generator used in the timing generator of FIG. 3, according to the present invention.

FIG. 12 is a block diagram of the high frequency clock 302 architecture used in the timing generator of FIG. 3, according to the present invention. In FIG. 12, the high frequency clock 302 includes a reference clock 1202 (e.g., 10 MHz), a high frequency (e.g., 1.6 GHz) synthesizer 1204 (e.g., implemented via typical conventional or fractional-N phase-lock loop structure), a loop filter 1208, an adder 1210, and a voltage controlled oscillator (VCO) 1206 having high Q (e.g., in the range of 5-100 for an on-chip resonator implementation or in the range of 100-1000 for an off-chip resonator implementation) and low jitter or phase noise. The reference clock 1202 is coupled to the high frequency synthesizer 1204 and provides the clock signals 320. The high frequency synthesizer 1204 receives the control signal 302a ("Coarse Freq") for performing a coarse frequency adjustment of the synthesized frequency. The fast modulation signal 332 ("Fast Modulation," for modulating the VCO at rates in excess of the PLL loop bandwidth typically governed by the loop filter) is filtered via filter 1212 to generate the filtered fast modulation signal 334. The filtered fast modulation signal 334 and the output of the synthesizer 1204 filtered through the loop filter 1208 are coupled to the adder 1210. The output of adder 1210 is coupled to the VCO 1206. The VCO 1206 generates the signals 308 and 310 (e.g., sinusoidal signals) with 0° and 90° phase relationships.

Figure 13:
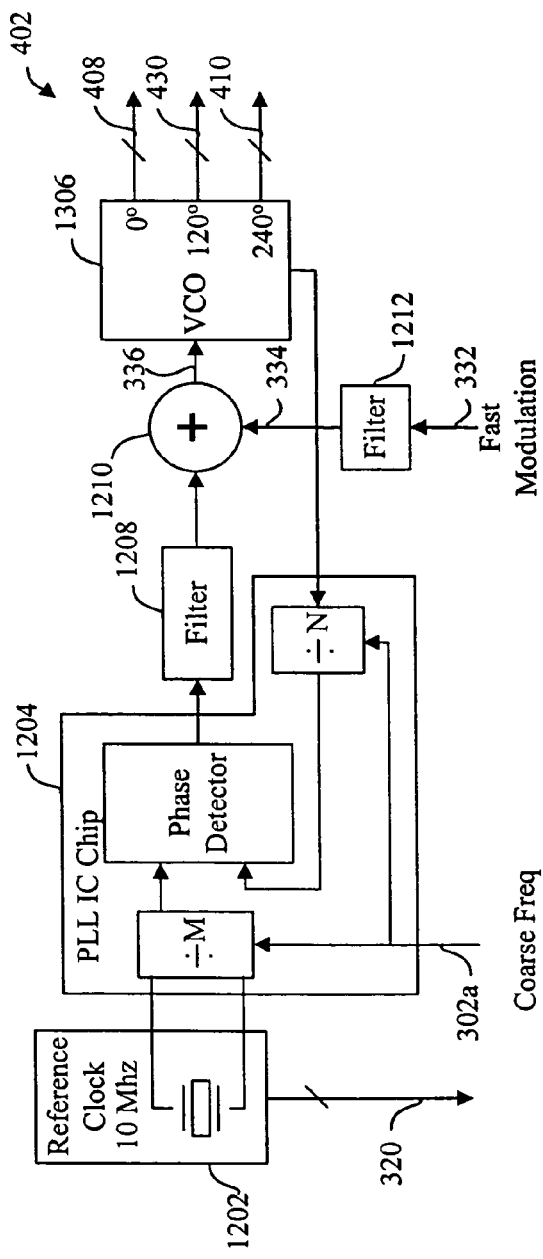
FIG. 13 is a block diagram of a high frequency clock generator used in the timing generator of FIG. 4, according to the present invention.

FIG. 13 is a block diagram of a high frequency clock architecture used in the timing generator of FIG. 4, according to the present invention. In FIG. 13, the high frequency clock 402 includes a reference clock 1202 (e.g., 10 MHz), a high frequency (e.g., 1.6 GHz) synthesizer 1204 (e.g., implemented via a typical conventional or fractional-N phase-lock loop), a loop filter 1208, an adder 1210, and a voltage controlled oscillator (VCO) 1306 having high Q (e.g., in the range of 5-100 for an on-chip resonator implementation or in the range of 100-1000 for an off-chip resonator implementation) and low jitter or phase noise. The reference clock 1202 is coupled to the high frequency synthesizer 1204 and provides the clock signals 320. The high frequency synthesizer 1204, receives the control signal 302a ("Coarse Freq") for performing a coarse frequency adjustment of the synthesized frequency. The fast modulation signal 332 ("Fast Modulation," for modulating the VCO at rates in excess of the PLL loop bandwidth typically governed by the loop filter) is filtered via filter 1212 to generate the filtered fast modulation signal 334. The filtered fast modulation signal 334 and the output of the synthesizer 1204 filtered through the loop filter 1208 are coupled to the adder 1210. The output of adder 1210 is coupled to the VCO 1306. The VCO 1306 generates the signals 408, 430 and 410 (e.g., sinusoidal signals) with 0°, 120° and 240° phase relationships.

The present invention may be implemented by the preparation of application-specific integrated circuits or by interconnecting an appropriate network of conventional component circuits. All or a portion of the invention may be conveniently implemented using conventional general-purpose computers, microprocessors, digital signal processors, etc., programmed according to the teachings of the present invention, as will be apparent to those skilled in the computer art. Appropriate software can be readily prepared by programmers of ordinary skill based on the teachings of the present disclosure, as will be apparent to those skilled in the software art.

The present invention stores information relating to various processes described herein. This information is stored in one or more memories such as a hard disk, optical disk, magneto-optical disk, and/or RAM, for example. One or more databases may store the information used to implement the present invention. The databases are organized using data structures (e.g., records, tables, arrays, fields, graphs, trees, and/or lists) contained in one or more memories or any of the storage devices listed in the discussion of FIG. 18, for example.

Figure 14:
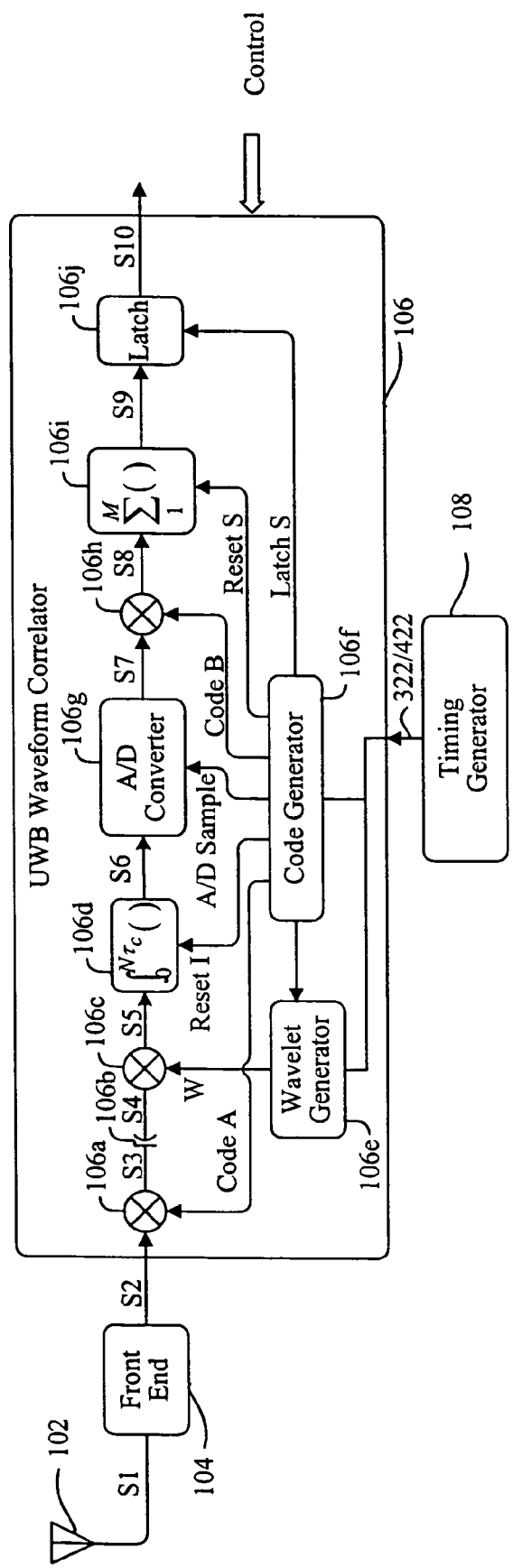
FIG. 14 is a block diagram of a waveform correlator of FIGS. 1A and 2, according to the present invention.
Figure 15:
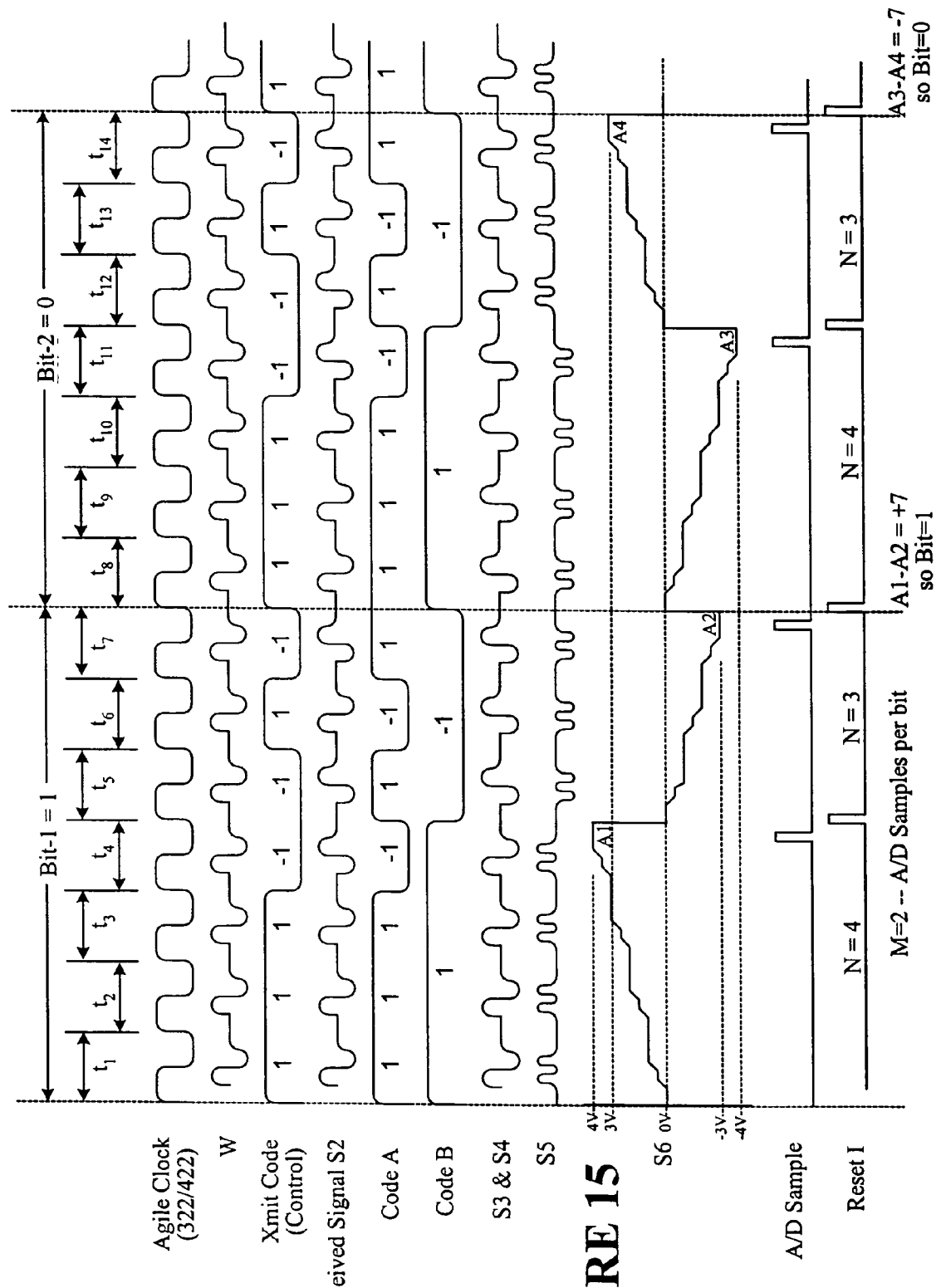
FIG. 15 is a timing diagram for illustrating the operation of the waveform correlator of FIG. 14, according to the present invention.

FIG. 14 illustrates details of the UWB waveform correlator 106 of FIG. 2, according to the present invention. FIG. 15 is a timing diagram corresponding to the signals discussed with respect to FIG. 14. In FIG. 14, a signal S1 gets coupled into the antenna 102 is amplified and filtered by the front end 104. The output of the front end 104 is a signal S2, which goes into a first mixer 106a. The first mixer 106a mixes the incoming signal S2 with a Code A signal and produces signal S3. The signal S3 passes through capacitor 106b as signal S4. The signal S4 is then mixed via mixer 106c with a sequence of wavelets W from the wavelet generator 106e. The wavelet generator 106e is triggered by the signal 322/422 of the timing generator 108 to generate the wavelets W. The output of the mixer 106c is signal S5, which has a DC component therein and is passed to an integrator 106d. The integrator 106d output is signal S6, which integrates up to the amplitude point labeled A1, as shown in FIG. 15.

At this point, the integrator 106d is reset by the signal Reset I. Integrator 106d continues to integrate signal S5, causing the integrator 106d to integrate down to the amplitude point labeled A2 due to the fact that the signal S5 has negative amplitude small pulse at that point. At point A1 the A/D converter 106g samples the signal S6 at point A1, as shown in FIG. 15. In a similar manner the A/D converter 106g samples the signal S6 at points A2, A3, A4, etc. The A/D converter outputs the samples as signal S7, which is multiplied with a Code B signal by a digital multiplier 106h. In the exemplary timing diagram shown in FIG. 15, the Code B signal essentially inverts the signal S7 on the second sample of each bit (i.e., the signal S6 sampled at points A2 and A4). A summer 106i sums, for example, two consecutive samples (e.g., M=2) on the signal S7 corresponding to the points A1 and A2 on the signal S6.

Accordingly, the signal S9 equals the signal S6 sampled at the point A1 multiplied by +1 plus the signal S6 sampled at the point A2 multiplied by −1 (i.e., S9=+1×A1+−1×A2). Latch 106j latches the value on signal S9 as signal S10. Then summer 106i is reset via signal Reset S. The latch 106j ensures that proper alignment of the signal S10, which is provided to the radio controller and interface 110.

Control signals ("Control") also are provided to the waveform correlator 106, as shown in FIG. 14, from the radio controller and interface 110. The Control signals communicate the parameters (e.g., code length, code values, etc.) for the actual codes generated by the code generator 106f (e.g., Code A, Code B, Xmit Code, etc.). A transmit code, Xmit Code, is shown, for example, as a seven-bit length code in FIG. 15. The Control signals also program the wavelet generator 106e via the code generator 106f for different wavelet styles (e.g., odd symmetry, even symmetry, different center frequency wavelets, different amplitudes, different phases, wavelet width, etc). The control signals also program code B, for example, to always be a positive value (e.g., +1), and the A/D converter 106g and integrator 106d to integrate and sample only once per bit. In this way, the digital multiplier 106h and summer 106i essentially disappear because in this case the signal S7 would always be multiplied by +1 (i.e., S8=+1×S7). The control signals might also program code B, for example, to be an L length sequence of plus and minus ones, and code A to repeat L times for each bit, and the A/D 106g and integrator 106d to integrate and sample once per Code A repetition. In this way, if Code A were, for example, an M length sequence, then a bit would be comprised of M*L chips.

Figure 16:
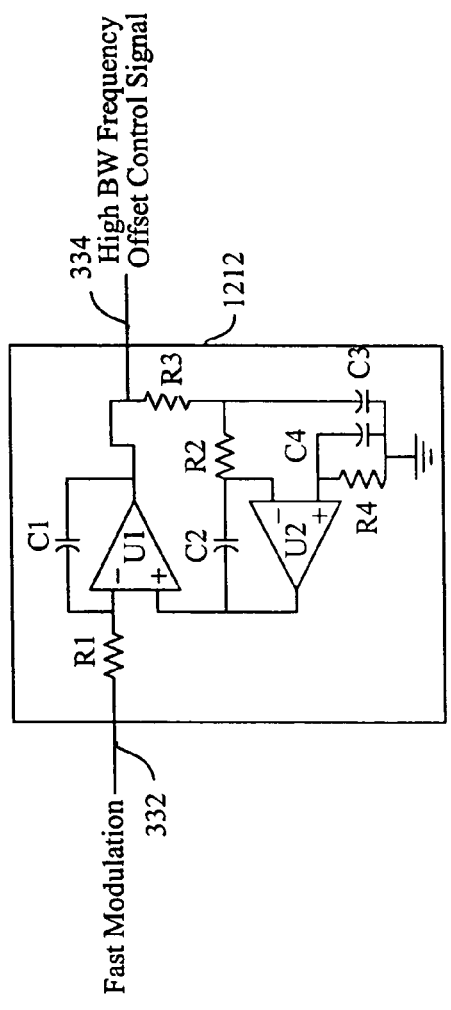
FIG. 16 is a schematic diagram showing an exemplary filter for receiving a high bandwidth modulation signal input to the high frequency clock generator of FIGS. 12 and 13, according to the present invention.
Figure 17:
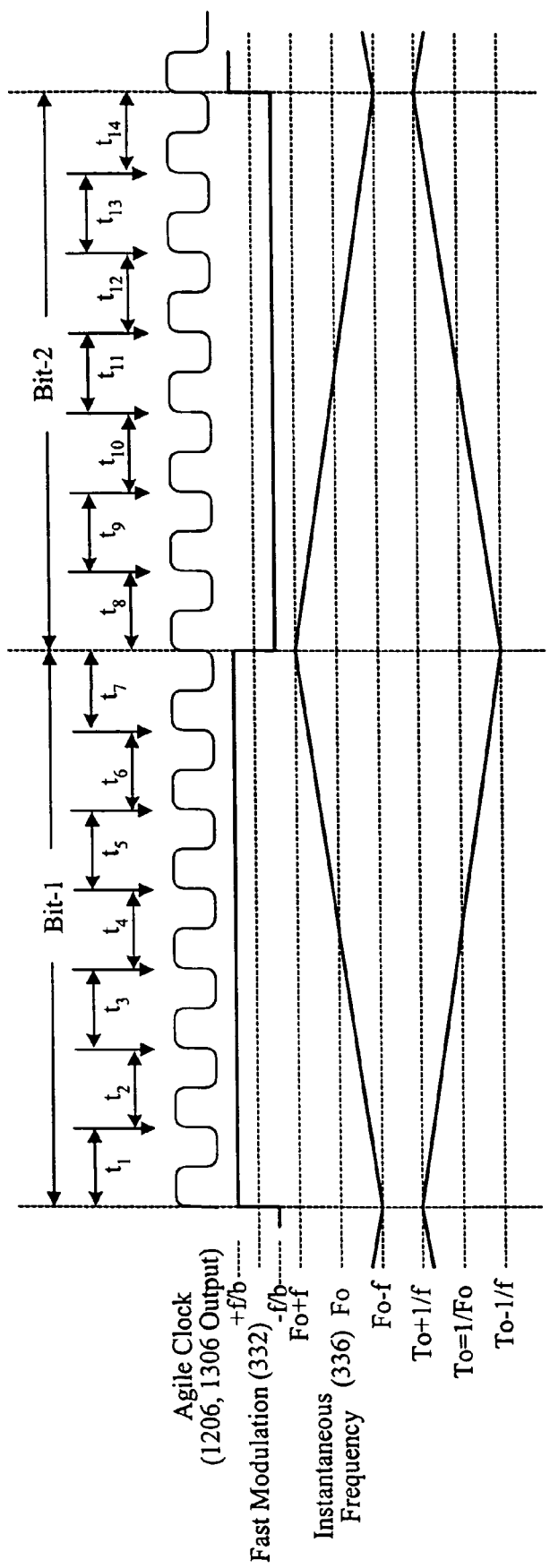
FIG. 17 is a timing diagram for illustrating the operation of the filter of FIG. 16, according to the present invention.

FIG. 16 illustrates the filter 1212 of the high frequency clock of FIGS. 12 and 13, according to the present invention. FIG. 17 is an exemplary timing diagram corresponding to the signals discussed with respect to FIG. 16, when the control signal 332 ("Fast Modulation") is used to implement a chirping system. The control signal 332 enters filter 1212 and the circuitry including U1, R1 and C1 implement an integrator. The integrator, comprised of R1, C1 and U1, includes a feedback loop, which provides for DC bias cancellation. In this way, if the signal 332 ("Fast Modulation") included any sort of DC bias, which would normally drive the integrator to saturation, the other circuitry cancels such DC bias and forces the average value of the output signal 334 towards zero.

With the above structure, a square wave as the signal 332 would cause the output of the filter 1212, signal 334, to continuously ramp up, then ramp down, with a DC bias level of zero. This is because, the filter R3, C3 act as a lowpass filter, and the feedback loop through U2 into U1 will drive the output of U1, signal 334, to zero. With this structure, any high frequency signal components of signal 334 are filtered with R3, C3 and are therefore not passed through the feedback loop. However, any low frequency signal components of signal 334 (i.e., DC bias) are cancelled through that feedback loop. The filter 1212, although configured as an integrator for implementing a chirping system, is for exemplary purposes only and may take on other configurations for other types of system implementations, as will be appreciated by those skilled in the relevant art(s).

With the above circuit structure, when the signal 332 goes positive, the output of the filter 1212, signal 334, ramps up as shown in FIG. 17. This is equivalent to the frequency ramping up. A signal 336 ("Instantaneous Frequency") 336 has an F0 component generated from the output of filter 1208, and ramp component generated on signal 334. Accordingly, F0 determines the center frequency and phase of the clock signal 336 into the VCO 1206, 1306 and the signal 332 ("Fast Modulation") determines the instantaneous frequency (signal 336) according to the ramping function. That is, using a fast modulation of a square wave as signal 332 and passing signal 332 through the filter 1212, implemented as an integrator, generates a ramp on signal 336. The ramp on signal 336 drives the VCO 1206, 1306, generating a ramping frequency on the outputs of the VCO 1206, 1306. With the frequency ramping, the time between wavelets being sent is t1, t2, t3, etc., as shown in FIG. 17, and as the frequency ramps up, the time between zero crossings decrease on the agile timing signals output by the VCO 1206, 1306.

Accordingly, although not shown, period t1 would be longer than t2, period t2 would be longer than t3, etc. Thus, period t7 would be the shortest amongst periods t1-t6 during Bit-1 in FIG. 17. During the next bit time, Bit-2, since the signal 332 ("Fast Modulation") is now inverted, the signal 336 begins to ramp down. Therefore, the signal 336 ("Instantaneous Frequency") starts out at a high level and ramps down.

Similarly, although not shown, period t8 would be shorter than t9, period t9 would be shorter than t10, etc. Thus, the period t14 t7 would be the longest amongst periods t8-t14 during Bit-2 in FIG. 17. Therefore, the wavelets would be generated further and further apart during Bit-2. The above-noted process would repeat during the subsequent bit times, thus implementing a chirping system.

FIG. 18 illustrates a computer system 1802 upon which the present invention may be implemented. The computer system 1802 may be any one of a personal computer system, a work station computer system, a lap top computer system, an embedded controller system, a microprocessor-based system, a digital signal processor-based system, a hand held device system, a personal digital assistant (PDA) system, a gaming system, a range-finding system, a location finding system, a wireless telephony system, a file sharing system, a wireless networking system, etc. The computer system 1802 includes a bus 1804 or other communication mechanism for communicating information and a processor 1806 coupled with bus 1804 for processing the information. The UWB transceivers 100 or 200 of FIG. 1A or 2 may be coupled to the bus 1804 via the "RX Data Out" and "TX Data In" signal lines to provide a UWB wireless transceiver function for the computer system 1802. The UWB transceivers 100 or 200 may take the form of an internal card, PCMCIA card, external device, etc. The computer system 1802 also includes a main memory 1808, such as a random access memory (RAM) or other dynamic storage device (e.g., dynamic RAM (DRAM), static RAM (SRAM), synchronous DRAM (SDRAM), flash RAM), coupled to bus 1804 for storing information and instructions to be executed by processor 1806. In addition, main memory 1808 may be used for storing temporary variables or other intermediate information during execution of instructions to be executed by processor 1806. Computer system 1802 further includes a read only memory (ROM) 1810 or other static storage device (e.g., programmable ROM (PROM), erasable PROM (EPROM), and electrically erasable PROM (EEPROM)) coupled to bus 1804 for storing static information and instructions for processor 1806. A storage device 1812, such as a magnetic disk or optical disk, is provided and coupled to bus 1804 for storing information and instructions.

The computer system 1802 may also include special purpose logic devices (e.g., application specific integrated circuits (ASICs)) or configurable logic devices (e.g., generic array of logic (GAL) or re-programmable field programmable gate arrays (FPGAs)). Other removable media devices (e.g., a compact disc, a tape, and a removable magneto-optical media) or fixed, high density media drives, may be added to the computer system 1802 using an appropriate device bus (e.g., a small computer system interface (SCSI) bus, an enhanced integrated device electronics (IDE) bus, or an ultra-direct memory access (DMA) bus). The computer system 1802 may additionally include a compact disc reader, a compact disc reader-writer unit, or a compact disc jukebox, each of which may be connected to the same device bus or another device bus.

The computer system 1802 may be coupled via bus 1804 to a display 1814, such as a cathode ray tube (CRT), liquid crystal display (LCD), voice synthesis hardware and/or software, etc., for displaying and/or providing information to a computer user. The display 1814 may be controlled by a display or graphics card. The computer system includes input devices, such as a keyboard 1816 and a cursor control 1818, for communicating information and command selections to processor 1806. Such command selections can be implemented via voice recognition hardware and/or software functioning as the input devices 1816. The cursor control 1818, for example, is a mouse, a trackball, cursor direction keys, touch screen display, optical character recognition hardware and/or software, etc., for communicating direction information and command selections to processor 1806 and for controlling cursor movement on the display 1814. In addition, a printer may provide printed listings of the data structures, information, etc., or any other data stored and/or generated by, and or communicated to, the computer system 1802.

The computer system 1802 performs a portion or all of the processing steps of the invention in response to processor 1806 executing one or more sequences of one or more instructions contained in a memory, such as the main memory 1808. Such instructions may be read into the main memory 1808 from another computer readable medium, such as storage device 1812. One or more processors in a multi-processing arrangement may also be employed to execute the sequences of instructions contained in main memory 1808. In alternative embodiments, hard-wired circuitry may be used in place of or in combination with software instructions. Thus, embodiments are not limited to any specific combination of hardware circuitry and software.

As stated above, the system 1802 includes at least one computer readable medium or memory programmed according to the teachings of the invention and for containing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling the computer system 1802, for driving a device or devices for implementing the invention, and for enabling the computer system 1802 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 1806 for execution. A computer readable medium may take many forms, including but not limited to, non-volatile media, volatile media, and transmission media. Non-volatile media includes, for example, optical, magnetic disks, and magneto-optical disks, such as storage device 1812. Volatile media includes dynamic memory, such as main memory 1808. Transmission media includes coaxial cables, copper wire and fiber optics, including the wires that comprise bus 1804. Transmission media also may take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 1806 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 1802 may receive the data on the telephone line and use an infrared transmitter to convert the data to an infrared signal. An infrared detector coupled to bus 1804 can receive the data carried in the infrared signal and place the data on bus 1804. Similarly, the UWB transceiver 100 or 220 coupled to bus 1804 can receive the data carried in a wireless signal and place the data on bus 1804. The bus 1804 carries the data to main memory 1808, from which processor 1806 retrieves and executes the instructions. The instructions received by main memory 1808 may optionally be stored on storage device 1812 either before or after execution by processor 1806.

The computer system 1802 also includes a communication interface 1820 coupled to bus 1804. Communication interface 1820 provides a two-way data communication coupling to a network link 1822 that may be connected to, for example, a local network 1824. For example, communication interface 1820 may be a network interface card to attach to any packet switched local area network (LAN). As another example, communication interface 1820 may be an asymmetrical digital subscriber line (ADSL) card, an integrated services digital network (ISDN) card or a modem to provide a data communication connection to a corresponding type of telephone line. Wireless links may also be implemented via the communication interface 1820 and/or the UWB transceiver 100 or 220. In any such implementation, communication interface 1820 sends and receives electrical, electromagnetic or optical signals that carry digital data streams representing various types of information.

Network link 1822 typically provides data communication through one or more networks to other data devices. For example, network link 1822 may provide a connection to a computer 1826 through local network 1824 (e.g., a LAN) or through equipment operated by a service provider, which provides communication services through a communications network 1828. In preferred embodiments, local network 1824 and communications network 1828 preferably use electrical, electromagnetic, or optical signals that carry digital data streams. The signals through the various networks and the signals on network link 1822 and through communication interface 1820, which carry the digital data to and from computer system 1802, are exemplary forms of carrier waves transporting the information. Computer system 1802 can transmit notifications and receive data, including program code, through the network(s), network link 1822 and communication interface 1820 and/or the UWB transceiver 100 or 220.

Although the present invention is described in terms of a timing generator for use in UWB communication systems, the present invention is applicable to other systems, such as UWB radar systems, UWB sonar systems, were the wavelet generator may operate at lower frequencies and be coupled to an acoustic transducer, cable communication systems, where precise timing control is required, etc., as will be appreciated by those skilled in the relevant art(s).

Although the present invention is described in terms of using a single phase-accumulator 324 to minimize hardware for situations where all multipath terms are essentially moving together over the short duration of transmission and reception burst cycles, multiple phase-accumulators could be used in practicing the present invention where multipath terms are moving at different velocities, as will be appreciated by those skilled in the relevant art(s).

Although the present invention is described in terms of using a single high frequency clock 302/402, multiple high frequency clock s could be used in practicing the present invention, as will be appreciated by those skilled in the relevant art(s).

Although the present invention is described in terms of providing a coarse frequency adjustment signal 302a to the high frequency clock 302/402, a phase adjustment signal could also be provided to the high frequency clock 302/402 in practicing the present invention, as will be appreciated by those skilled in the relevant art(s).

Numerous modifications and variations of the present invention are possible in light of the above teachings. It is therefore to be understood that within the scope of the appended claims, the invention may be practiced otherwise than as specifically described herein.

What is claimed:

1. A control generator, comprising:
   a summer configured to add a ramping phase adjustment signal and a basic phase adjustment signal to generate a combined phase adjustment signal;
   a look-up table configured to generate first through $N^{th}$ digital phase and frequency adjustment signals; and
   first through $N^{th}$ digital to analog converters configured to convert the first through $N^{th}$ digital phase and frequency adjustment signals to first through $N^{th}$ analog phase and frequency adjustment signals in accordance with first through $N^{th}$ clock signals, respectively; and
   first through $N^{th}$ low pass filters configured to filter the first through $N^{th}$ analog phase and frequency adjustment signals to generate first through $N^{th}$ filtered phase and frequency adjustment signals,
   wherein N is an integer greater than 1.

2. The control generator of claim 1, wherein the first through $N^{th}$ analog phase and frequency adjustment signals are sinusoidal signals.

3. The control generator of claim 1, further comprising a clock generation circuit configured to generate the first through $N^{th}$ clock signals.

4. The control generator of claim 1,
   wherein N is 2, and
   wherein a second clock signal is a 90° phase-shifted version of the first clock signal.

5. The control generator of claim 1,
   wherein N is 3, and
   wherein the first through third clock signals are the same.

6. A control generator, comprising:
   a summer configured to add a ramping phase adjustment signal and a basic phase adjustment signal to generate a combined phase adjustment signal;
   a look-up table configured to generate first through $N^{th}$ digital phase and frequency adjustment signals; and
   first through $N^{th}$ digital to analog converters configured to convert the first through $N^{th}$ digital phase and frequency adjustment signals to first through $N^{th}$ analog phase and frequency adjustment signals in accordance with first through $N^{th}$ clock signals, respectively; and a clock generation circuit configured to generate the first through $N^{th}$ clock signals, wherein N is an integer greater than 1, wherein the clock generation circuit is a quadrature network configured to generate the first clock signal and a second clock signal, and wherein the second clock signal is a 90° phase-shifted version of the first clock signal.

7. The control generator of claim 6, further comprising first through $N^{th}$ low pass filters configured to filter the first through $N^{th}$ analog phase and frequency adjustment signals to generate first through $N^{th}$ filtered phase and frequency adjustment signals.

8. The control generator of claim 6, wherein the first through $N^{th}$ analog phase and frequency adjustment signals are sinusoidal signals.

9. The control generator of claim 6, wherein N is 2, and wherein a second clock signal is a 90° phase-shifted version of the first clock signal.

10. The control generator of claim 6, wherein N is 3, and wherein the first through third clock signals are the same.

11. A control generator, comprising:

a clock generation circuit configured to generate the first through $M^{th}$ clock signals;

a summer configured to add a ramping phase adjustment signal and a basic phase adjustment signal to generate a combined phase adjustment signal;

a look-up table configured to generate first through $N^{th}$ digital phase and frequency adjustment signals based on the combined phase adjustment signal;

a multiplexer configured to select one of the first through $N^{th}$ digital phase and frequency adjustment signals based on a control signal;

a digital to analog converter configured to convert the selected digital phase and frequency adjustment signal to a selected analog phase and frequency adjustment signal in accordance with first through $N^{th}$ clock signals, respectively; and first through $N^{th}$ primary sample and hold circuits, each configured to perform a sample and hold operation on the selected analog phase and frequency adjustment signal based on one or more of the first through $M^{th}$ clock signals, to generate a corresponding first through $N^{th}$ primary sampled phase and frequency adjustment signals, wherein the control signal is generated based on the first through $M^{th}$ clock signals, and wherein N is an integer greater than 1.

12. The control generator of claim 11, further comprising first through $N^{th}$ low pass filters configured to filter the first through $N^{th}$ sampled phase and frequency adjustment signals to generate first through $N^{th}$ filtered phase and frequency adjustment signals.

13. The control generator of claim 11, wherein the first through $N^{th}$ analog phase and frequency adjustment signals are sinusoidal signals.

14. The control generator of claim 11, further comprising a clock generation circuit configured to generate the first through $M^{th}$ clock signals.

15. The control generator of claim 14, wherein M is 2, wherein the clock generation circuit is a quadrature network configured to generate the first clock signal and a second clock signal, and wherein the second clock signal is a 90° phase-shifted version of the first clock signal.

16. The control generator of claim 14, wherein M is 4, wherein the clock generation circuit is a phasing network configured to generate the first through fourth clock signals, wherein a second clock signal is a 90° phase-shifted version of the first clock signal, wherein a third clock signal is a 180° phase-shifted version of the first clock signal, and wherein a fourth clock signal is a 270° phase-shifted version of the first clock signal.

17. The control generator of claim 11, wherein N and M are both 2, wherein a second clock signal is a 90° phase-shifted version of the first clock signal, wherein the first primary sample and hold circuit operates in response to the first clock signal, wherein the second primary sample and hold circuit operates in response to the second clock signal, and wherein the first digital phase and frequency adjustment signal and the second digital phase and frequency adjustment signal are 90° out of phase from each other.

18. The control generator of claim 11, wherein N is 3 and M is 4, wherein a second clock signal is a 90° phase-shifted version of the first clock signal, wherein a third clock signal is a 180° phase-shifted version of the first clock signal, wherein a fourth clock signal is a 270° phase-shifted version of the first clock signal, wherein the first primary sample and hold circuit operates in response to the first clock signal, wherein the second primary sample and hold circuit operates in response to the second clock signal, and wherein the third primary sample and hold circuit operates in response to the third clock signal.

19. The control generator of claim 18, further comprising first through $N^{th}$ secondary sample and hold circuits, each configured to perform a sample and hold operation on corresponding first through $N^{th}$ primary sampled phase and frequency adjustment signals to generate a corresponding first through $N^{th}$ secondary sampled phase and frequency adjustment signals, wherein the secondary sample and hold circuits each operate in response to the fourth clock signal.

* * * * *